US010839284B2

(12) United States Patent
Hashimoto et al.

(10) Patent No.: US 10,839,284 B2
(45) Date of Patent: Nov. 17, 2020

(54) JOINT MANY-TASK NEURAL NETWORK MODEL FOR MULTIPLE NATURAL LANGUAGE PROCESSING (NLP) TASKS

(71) Applicant: salesforce.com, inc., San Francisco, CA (US)

(72) Inventors: Kazuma Hashimoto, San Francisco, CA (US); Caiming Xiong, Palo Alto, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 768 days.

(21) Appl. No.: 15/421,407

(22) Filed: Jan. 31, 2017

(65) Prior Publication Data

US 2018/0121787 A1    May 3, 2018

Related U.S. Application Data

(60) Provisional application No. 62/417,269, filed on Nov. 3, 2016, provisional application No. 62/418,070, filed on Nov. 4, 2016.

(51) Int. Cl.
*G06N 3/04* (2006.01)
*G06N 3/08* (2006.01)
(Continued)

(52) U.S. Cl.
CPC ............. *G06N 3/04* (2013.01); *G06F 40/205* (2020.01); *G06F 40/216* (2020.01);
(Continued)

(58) Field of Classification Search
CPC ...... G06N 3/04; G06N 3/0445; G06N 3/0472; G06N 3/063; G06N 3/08; G06F 17/2705; G06F 17/274; G06F 17/2785
See application file for complete search history.

(56) References Cited

U.S. PATENT DOCUMENTS 10,282,663 B2   5/2019   Socher et al.
10,346,721 B2   7/2019   Albright et al.
(Continued)

FOREIGN PATENT DOCUMENTS

CN   105244020 A   1/2016
EP   0865030 A2   9/1998

OTHER PUBLICATIONS

Kiperwasser., "Easy-First Dependency Parsing with Hierarchical Tree LSTMs," Transactions of the Association for Computational Linguistics, vol. 4. Aug. 2016. pp. 1-18. (Year: 2016).*
(Continued)

*Primary Examiner* — Li B. Zhen
*Assistant Examiner* — Henry Nguyen
(74) *Attorney, Agent, or Firm* — Haynes and Boone, LLP

(57) ABSTRACT

The technology disclosed provides a so-called "joint many-task neural network model" to solve a variety of increasingly complex natural language processing (NLP) tasks using growing depth of layers in a single end-to-end model. The model is successively trained by considering linguistic hierarchies, directly connecting word representations to all model layers, explicitly using predictions in lower tasks, and applying a so-called "successive regularization" technique to prevent catastrophic forgetting. Three examples of lower level model layers are part-of-speech (POS) tagging layer, chunking layer, and dependency parsing layer. Two examples of higher level model layers are semantic relatedness layer and textual entailment layer. The model achieves the state-of-the-art results on chunking, dependency parsing, semantic relatedness and textual entailment.

15 Claims, 25 Drawing Sheets

(51) Int. Cl.
G06F 40/30 (2020.01)
G06F 40/205 (2020.01)
G06F 40/216 (2020.01)
G06F 40/253 (2020.01)
G06F 40/284 (2020.01)
G06N 3/063 (2006.01)
G10L 15/18 (2013.01)
G10L 25/30 (2013.01)
G10L 15/16 (2006.01)
G06F 40/00 (2020.01)

(52) U.S. Cl.
CPC .......... *G06F 40/253* (2020.01); *G06F 40/284* (2020.01); *G06F 40/30* (2020.01); *G06N 3/0445* (2013.01); *G06N 3/0454* (2013.01); *G06N 3/0472* (2013.01); *G06N 3/063* (2013.01); *G06N 3/08* (2013.01); *G06N 3/084* (2013.01); *G06F 40/00* (2020.01); *G10L 15/16* (2013.01); *G10L 15/18* (2013.01); *G10L 25/30* (2013.01)

(56) References Cited

U.S. PATENT DOCUMENTS

2016/0350653 A1  12/2016  Socher et al.
2017/0032280 A1  2/2017  Socher et al.
2017/0046616 A1  2/2017  Socher et al.

OTHER PUBLICATIONS

Kim et al. "Character-Aware Neural Language Models" Association for the Advancement of Artificial Intellifence, 2016, pp. 2741-2749 (Year: 2016).*
Miwa, Makoto, and Mohit Bansal. "End-to-end relation extraction using lstms on sequences and tree structures." arXiv preprint arXiv:1601.00770 (Jun. 2016). (Year: 2016).*
Xu, Yan, et al. "Classifying relations via long short term memory networks along shortest dependency paths." Proceedings of the 2015 conference on empirical methods in natural language processing. 2015. (Year: 2015).*
Collobert et al., "Natural Language Processing (Almost) from scratch," Journal of Machine Learning Research. Jan. 12, 2011. pp. 1-45. (Year: 2011).*
Zhang etal., "Stack-Propagation: Improved Representation Learning for Syntax," Proceedings of the 54th Annual Meeting of the Association for Computational Linguistics (vol. 1: Long Papers). Stroudsburg, Pennsylvania. Jun. 8, 2016. pp. 1-10. (Year: 2016).*
Kim et al. "Character-Aware Neural Language Models" Association for the Advancement of Artificial Intellifence, 2016, pp. 2741-2749 (Year: 2016) (Year: 2016).*
Chen etal., "Enhancing and Combining Sequential and Tree LSTM for Natural Language Inference," Sep. 20, 2016. pp. 1-12. (Year: 2016) (Year: 2016).*
Alberti et al., "Improved Transition-Based Parsing and Tagging with Neural Networks," Proceedings of the 2015 Conference on Empirical Methods in Natural Language Processing. 2015. pp. 1-6.
Andor et al, "Globally Normalized Transition-Based Neural Networks," Proceedings of the 54th Annual Meeting of the Association for Computational Linguistics, vol. 1: Long Papers. Berlin, Germany. Aug. 7-12, 2016. pp. 1-11.
Attardi et al., "Chunking and Dependency Parsing," Proceedings of the Language Resources and Evaluation Conference (LREC) 2008 Workshop on Partial Parsing, 2008. Marrakech, Morocco. pp. 1-6.
Bohnet et al., "Top Accuracy and Fast Dependency Parsing is not a Contradiction," Proceedings of the 23rd International Conference on Computational Linguistics (Coling 2010). Beijing, China. Aug. 2010. pp. 1-9.
Chen et al., "Enhancing and Combining Sequential and Tree LSTM for Natural Language Inference," Proceedings of the 55th Annual Meeting of the Association for Computational Linguistics. Vancouver, Canada. Jul. 30-Aug. 4, 2017. pp. 1-12.
Choe et al., "Parsing as Language Modeling," Proceedings of the 2016 Conference on Empirical Methods in Natural Language Processing. Austin, Texas. Nov. 1-5, 2016. pp. 1-6.
Collobert et al., "Natural Language Processing (Almost) from scratch," Journal of Machine Learning Research. Jan. 12, 2011 pp. 1-45.
Dong et al., "KL-Divergence Regularized Deep Neural Network Adaptation for Improved Large Vocabulary Speech Recognition," 2013 IEEE International Conference on Acoustics, Speech and Signal Processing (ICASSP). Vancouver, BC. May 2013. Institute of Electrical and Electronics Engineers. Piscataway, NJ. May 26, 2013. pp. 1-5.
Dyer et al., "Transition Based Dependency Parsing with Stack Long Short-Term Memory," Proceedings of the 53rd Annual Meeting of the Association for Computational Linguistics and the 7th International Joint Conference on Natural Language Processing (vol. 1: Long Papers). Jul. 26-31, 2015. Beijing, China. pp. 1-10.
Eriguchi et al., "Tree-to-Sequence Attentional Neural Machine Translation," Proceedings of the 54th Annual Meeting of the Association for Computational Linguistics (vol. 1: Long Papers). Berlin, Germany. Aug. 7-12, 2016. pp. 1-11.
Goodfellow et al., "Maxout Networks," Proceedings of the 30th International Conference on Machine Learning. Atlanta, Georgia, USA. 2013. pp. 1-9.
Graves et al., "Framewise Phoneme Classification with Bidirectional LSTM and Other Neural Network Architectures," Proceedings of the International Joint Conference on Neural Networks (IJCNN), vol. 18. 2005. pp. 1-9.
Hashimoto et al., "A Joint Many-Task Model: Growing a Neural Network for Multiple NLP Tasks," Conference on Empirical Methods in Natural Language Processing (EMNLP). The University of Tokyo. Nov. 5, 2016. pp. 1-15.
Hinton et al., "Improving Neural Networks by Preventing Co-Adaption of Feature Detectors," CoRR, abs/1207.0580. https://arxiv.org/abs/1207.0580, Jul. 3, 2012. pp. 1-18.
Hochreiter et al., "Long Short-Term Memory: Neural Computation," Neural Computation, vol. 9, Issue 8. Nov. 15, 1997. pp. 1-32.
Kiperwasser., "Easy-First Dependency Parsing with Hierarchical Tree LSTMs," Transactions of the Association for Computational Linguistics, vol. 4. 2016. pp. 1-18.
Kudo et al., "Chunking with Support Vector Machines," Proceedings of the Second Meeting of the North American Chapter of the Association for Computational Linguistics. 2001. pp. 1-8.
Kumar et al. "Ask Me Anything: Dynamic Memory Networks for Natural Language Processing," vol. 48: Proceedings of the 33rd International Conference on Machine Learning, New York, NY, USA. Jun. 24, 2015. pp. 1-10.
Lai et al., "Illinois-LH: A Denotational and Distributional Approach to Semantics," Proceedings of the 8th International Workshop on Semantic Evaluation (SemEval 2014). Dublin, Ireland. Aug. 23-24, 2014. pp. 1-6.
Li et al., "Learning Without Forgetting," The 14th European Conference on Computer Vision. Amsterdam, The Netherlands. Oct. 8-16, 2016. pp. 1-13.
Ling et al., "Finding Function in Form: Compositional Character Models for Open Vocabulary Word Representation," Proceedings of the 2015 Conference on Empirical Methods in Natural Language Processing. Lisbon, Portugal. Sep. 17-21, 2015. pp. 1-11.
Luong et al. "Multi-Task Sequence to Sequence Learning," Proceedings of the 4th International Conference on Learning Representation. San Juan, Puerto Rico. May 2-4, 2016. pp. 1-10.
Ma et al., "End-to-End Sequence Labeling via Bi-Directional LSTM-CNNs-CRF," Proceedings of the 54th Annual Meeting of the Association for Computational Linguistics (vol. 1: Long Papers). Berlin, Germany. Aug. 7-12, 2016. pp. 1-12.
Marelli et al., "SemEval-2014 Task 1: Evaluation of Compositional Distributional Semantic Models on Full Sentences Through Semantic Relatedness and Textual Entailment," Proceedings of the 8th International Workshop on Semantic Evaluation (SemEval 2014). Dublin, Ireland. Aug. 23-24, 2014. pp. 1-8.

(56) References Cited

OTHER PUBLICATIONS

Mikolov et al., "Distributed Representations of Words and Phrases and their Compositionality," Advances in Neural Information Processing Systems 26. Lake Tahoe, Nevada. Dec. 5-10, 2013. pp. 1-9.
Mikolov et al., "Efficient Estimation of Word Representations in Vector Space," Proceedings of the International Conference on Learning Representation. Scottsdale, Arizona. May 2-4, 2013. pp. 1-12.
Misra et al., "Cross-Stitch Networks for Multi-Task Learning," Conference on Computer Vision and Pattern Recognition. Las Vegas, Nevada. Jun. 26-Jul. 1, 2016. pp. 1-10.
Pennington et al., "GloVe: Global Vectors for Word Representation," Proceedings of the 2014 Conference on Empirical Methods in Natural Language Processing (EMNLP). Doha, Qatar. Oct. 25-29, 2014. pp. 1-12.
Pham et al., "Dropout Improves Recurrent Neural Networks for Handwriting Recognition," CoRR, abs/1312.4569. https://arxiv.org/abs/1312.4569, Mar. 10, 2014. pp. 1-6.
Rusu et al., "Progressive Neural Networks," CoRR, abs/1606.04671. https://arxiv.org/abs/1606.04671, Sep. 7, 2016. pp. 1-14.
Socher et al., "Recursive Deep Models for Semantic Compositionality Over a Sentiment Treebank," Proceedings of the 2013 Conference on Empirical Methods in Natural Language Processing, Seattle, Washington. Oct. 18-21, 2013. pp. 1-12.
Socher et al., "Semantic Compositionality Through Recursive Matrix-Vector Spaces," Proceedings of the 2012 Joint Conference on Empirical Methods in Natural language Processing and Computational Natural Language Learning. Jeju Island, Korea. Jul. 12-14, 2012. pp. 1-11.
Sogaard et al., "Deep Multi-Task Learning With Low Level Tasks Supervised at Lower Layers," Proceedings of the 54th Annual Meeting of the Association for Computational Linguistics (vol. 2: Short Papers). Berlin, Germany. Aug. 7-12, 2016. pp. 1-5.
Soggard et al., "Semi-Supervised Condensed Nearest Neighbor for Part-of-Speech Tagging," Proceedings of the 49th Annual Meeting of the Association for Computational Linguistics. Portland, Oregon. Jun. 19-24, 2011. pp. 1-5.
Sutskever et al., "Sequence to Sequence Learning with Neural Networks," Advances in Neural Information Processing Systems. Montreal, Canada. Dec. 8-13, 2014. pp. 1-9.
Suzuki et al., "Semi-Supervised Sequential Labeling and Segmentation Using Giga-Word Scale Unlabeled Data," Proceedings of the 46th Annual Meeting of the Association for Computational Linguistics on Human Language Technologies. Columbus, Ohio. Jun. 16, 2008. pp. 1-8.
Tai et al., "Improved Semantic Representations from Tree-Structured Long Short-Term Memory Networks," Proceedings of the 53rd Annual Meeting of the Association for Computational Linguistics and the 7th International Joint Conference on Natural Language Processing. Beijing, China. Jul. 26-31, 2015. pp. 1-11.
Toutanova et al., "Feature-Rich Part-of-Speech Tagging with a Cyclic Dependency Network," Proceedings of the 2003 Human Language Technology Conference of the North American Chapter of the Association for Computational Linguistics. Stroudsburg, PA. May 27-Jun. 1, 2003. pp. 1-8.
Tsuruoka et al., "Learning to Lookahead: Can History-Based Models Rival Globally Optimized Models?" Proceedings of the 15th Conference on Computational Language Learning. Portland, Oregon. Jun. 23-24, 2011. pp. 1-9.
Weiss et al., "Structured Training for Neural Network Transition-Based Parsing," Proceedings of the 53rd Annual Meeting of the Association for Computational Linguistics and the 7th International Joint Conference on Natural Language Processing (vol. 1: Long Papers). Beijing, China. Jul. 27-31, 2015. pp. 1-11.
Wieting et al., "Charagram: Embedding Words and Sentences via Character n-grams," Proceedings of the 2016 Conference on Empirical Methods in Natural Language Processing. Austin, Texas. Nov. 1-5, 2016. pp. 1-12.
Yin et al., "ABCNN: Attention-Based Convolutional Neural Network for Modeling Sentence Pairs," Transactions of the Association for Computational Linguistics, vol. 4. Berlin, Germany. Aug. 7-12, 2016. pp. 1-14.
Zhang et al., "Stack-Propagation: Improved Representation Learning for Syntax," Proceedings of the 54th Annual Meeting of the Association for Computational Linguistics (vol. 1: Long Papers). Stroudsburg, Pennsylvania. Jun. 8, 2016. pp. 1-10.
Zhou et al., "Modelling Sentence Pairs with Tree-Structured Attentive Encoder," Proceedings of the 26th International Conference on Computational Linguistics. Osaka, Japan. Dec. 11-16, 2016. pp. 1-10.
International Search Report issued by the International Searching Authority for PCT App. No. PCT/US2017/060056, dated May 2, 2018. pp. 1-4.
Written Opinion issued by the International Searching Authority for PCT App. No. PCT/US2017/060056, dated May 2, 2018. pp. 1-7.
International Search Report issued by the International Searching Authority for PCT App. No. PCT/US2017/060057, dated Jan. 24, 2018. pp. 1-4.
Written Opinion issued by the International Searching Authority for PCT App. No. PCT/US2017/060057, dated Jan. 24, 2018. pp. 1-9.
International Search Report issued by the International Searching Authority for PCT App. No. PCT/US2017/060059, dated Feb. 13, 2018. pp. 1-4.
Written Opinion issued by the International Searching Authority for PCT App. No. PCT/US2017/060059, dated Feb. 13, 2018. pp. 1-8.
Deng et al., "Deep Convex Net: A Scalable Architecture for Speech Pattern Classification," Interspeech 2011, 2011, pp. 2285-2288.
International Preliminary Report on Patentability from PCT/US2017/060056, dated May 7, 2019, pp. 1-8.
International Preliminary Report on Patentability from PCT/US2017/060057, dated May 7, 2019, pp. 1-10.
International Preliminary Report on Patentability from PCT/US2017/060059, dated May 7, 2019, pp. 1-9.
Miwa et al., "End-to-End Relation Extraction using LSTMs on Sequences and Tree Structures," Proceedings of the 54th Annual Meeting of the Association for Computational Linguistics, Aug. 7-12, 2016, pp. 1105-1116.
Socher et al., "Reasoning with Neural Tensor Networks for Knowledge Base Completion," In Advances in Neural Information Processing Systems, pp. 1-10, 2013.
Srivastava et al., "Dropout: A Simple Way to Prevent Neural Networks from Overfilling," Journal of Machine Learning Research, 15, 2014, pp. 1929-1958.
Xiong et al., "Dynamic Memory Networks for Visual and Textual Question Answering," Proceedings of the 33rd International Conference on Machine Learning, New York, NY, USA, 2016. JMLR: W&CP vol. 48, pp. 1-10.
Zhang et al., "Bridging Neural Machine Translation and Bilingual Dictionaries," arXiv:1610.07272v1, 2016, pp. 1-10.
Zhang et al., "Multi-Label Output Codes using Canonical Correlation Analysis," Proceedings of the 14th International Conference on Artificial Intelligence and Statistics (AISTATS), vol. 15, 2011, pp. 873-882.
Zhang et al., "Representation Learning via Semi-Supervised Autoencoder for Multi-task Learning," 2015 IEEE International Conference on Data Mining, Nov. 14-17, 2015, pp. 1141-1146.
Office Action from Canada Patent Application No. 3,039,551, dated Jun. 4, 2020, pp. 1-5.
Yu, D. et al., "KL-divergence regularized deep neural network adaptation for improved large vocabulary speech recognition", 2013 IEEE International Conference on Acoustics, Speech and Signal Processing, pp. 7893-7897, May 31, 2013.

* cited by examiner

224 —

| Single | W&C | Only W |
|---|---|---|
| POS | 97.52 | 96.26 |
| Chunking | 95.65 | 94.92 |
| Dependency UAS | 93.38 | 92.90 |
| Dependency LAS | 91.37 | 90.44 |

Table 11: Effectiveness of the character $n$-gram embeddings.

226 —

| Single (POS) | Overall Acc. | Acc. for unknown words |
|---|---|---|
| W&C | 97.52 | 90.68 (3,502/3,862) |
| Only W | 96.26 | 71.44 (2,759/3,862) |

Table 14: POS tagging scores on the development set with and without the character $n$-gram embeddings, focusing on accuracy for unknown words. The overall accuracy scores are taken from Table 11. There are 3,862 unknown words in the sentences of the development set.

228 —

| Single (Dependency) | Overall scores | | Scores for unknown words | |
|---|---|---|---|---|
| | UAS | LAS | UAS | LAS |
| W&C | 93.38 | 91.37 | 92.21 (900/976) | 87.81 (857/976) |
| Only W | 92.90 | 90.44 | 91.39 (892/976) | 81.05 (791/976) |

Table 15: Dependency parsing scores on the development set with and without the character $n$-gram embeddings, focusing on UAS and LAS for unknown words. The overall scores are taken from Table 11. There are 976 unknown words in the sentences of the development set.

FIG. 2B

| Method | Acc. |
|---|---|
| JMT$_{all}$ | 97.55 |
| Ling et al. (2015) | 97.78 |
| Kumar et al. (2016) | 97.56 |
| Ma & Hovy (2016) | 97.55 |
| Søgaard (2011) | 97.50 |
| Collobert et al. (2011) | 97.29 |
| Tsuruoka et al. (2011) | 97.28 |
| Toutanova et al. (2003) | 97.27 |

Table 2: POS tagging results.

FIG. 4B

| Method | F1 |
|---|---|
| JMT$_{AB}$ | 95.77 |
| Søgaard & Goldberg (2016) | 95.56 |
| Suzuki & Isozaki (2008) | 95.15 |
| Collobert et al. (2011) | 94.32 |
| Kudo & Matsumoto (2001) | 93.91 |
| Tsuruoka et al. (2011) | 93.81 |

Table 3: Chunking results.

FIG. 5B (a) Underneath the headline "Diversification," "it counsels," "Based on the events of the past week, all investors need to know their portfolios are balanced to help protect them against the market's volatility."

(b) Mr. Eskandarian, who resigned his Della Femina post in September, becomes <u>chairman</u> and chief executive of Arnold.

FIG. 6H

| Method | UAS | LAS |
|---|---|---|
| $JMT_{all}$ | 94.67 | 92.90 |
| Single | 93.35 | 91.42 |
| Andor et al. (2016) | 94.61 | 92.79 |
| Alberti et al. (2015) | 94.23 | 92.36 |
| Weiss et al. (2015) | 93.99 | 92.05 |
| Dyer et al. (2015) | 93.10 | 90.90 |
| Bohnet (2010) | 92.88 | 90.71 |

Table 4: Dependency results.

FIG. 6I

| Method | MSE |
|---|---|
| $JMT_{all}$ | 0.233 |
| $JMT_{DE}$ | 0.238 |
| Zhou et al. (2016) | 0.243 |
| Tai et al. (2015) | 0.253 |

Table 5: Semantic relatedness results.

FIG. 7B

| Method | Acc. |
|---|---|
| JMT$_{all}$ | 86.2 |
| JMT$_{DE}$ | 86.8 |
| Yin et al. (2016) | 86.2 |
| Lai & Hockenmaier (2014) | 84.6 |

Table 6: Textual entailment results.

FIG. 8B

|  | $JMT_{all}$ | w/o SR |
|---|---|---|
| POS | 97.88 | 97.85 |
| Chunking | 97.59 | 97.13 |
| Dependency UAS | 94.51 | 94.46 |
| Dependency LAS | 92.60 | 92.57 |
| Relatedness | 0.236 | 0.239 |
| Entailment | 84.6 | 84.2 |

Table 8: Effectiveness of the Successive Regularization (SR).

FIG. 9B

|   |            | Single | JMT$_{all}$ | JMT$_{AB}$ | JMT$_{ABC}$ | JMT$_{DE}$ |
|---|------------|--------|---------|---------|----------|---------|
| A | POS        | 97.45  | 97.55   | 97.52   | 97.54    | n/a     |
| B | Chunking   | 95.02  | (97.12) | 95.77   | (97.28)  | n/a     |
| C | Dependency UAS | 93.35 | 94.67 | n/a     | 94.71    | n/a     |
|   | Dependency LAS | 91.42 | 92.90 | n/a     | 92.92    | n/a     |
| D | Relatedness | 0.247 | 0.233   | n/a     | n/a      | 0.238   |
| E | Entailment | 81.8   | 86.2    | n/a     | n/a      | 86.8    |

Table 1: Test set results for the five tasks. In the relatedness task, the lower scores are better.

FIG. 10

JOINT MANY-TASK NEURAL NETWORK MODEL FOR MULTIPLE NATURAL LANGUAGE PROCESSING (NLP) TASKS

CROSS REFERENCE TO OTHER APPLICATIONS

This application claims the benefit of U.S. Provisional Patent Application 62/417,269, "JOINT MANY-TASK MODEL", filed on Nov. 3, 2016. The priority provisional application is hereby incorporated by reference. This provisional application includes a technical paper that supplies additional details of the inventors' work;

This application claims the benefit of U.S. Provisional Patent Application 62/418,070, "JOINT MANY-TASK MODEL", filed on Nov. 4, 2016. The priority provisional application is hereby incorporated by reference. This provisional application includes a technical paper that supplies additional details of the inventors' work;

This application incorporates by reference US Nonprovisional Patent Application entitled "DEEP NEURAL NETWORK MODEL FOR PROCESSING DATA THROUGH MUTLIPLE LINGUISTIC TASK HIERARCHIES", filed contemporaneously herewith; and This application incorporates by reference US Nonprovisional Patent Application entitled "TRAINING A JOINT MANY-TASK NEURAL NETWORK MODEL USING SUCCESSIVE REGULARIZATION", filed contemporaneously herewith.

FIELD OF THE TECHNOLOGY DISCLOSED

The technology disclosed relates generally to an architecture for natural language processing (NLP) using deep neural networks, and in particular relates to multi-task learning using an end-to-end trainable joint many-task neural network model. This architecture is extensible to other multilayer analytical frameworks and tasks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Transfer and multi-task learning have traditionally focused on either a single source-target pair or very few, similar tasks. Ideally, the linguistic levels of morphology, syntax and semantics would benefit each other by being trained in a single model. The technology disclosed provides a so-called "joint many-task neural network model" to solve a variety of increasingly complex natural language processing (NLP) tasks using a growing depth of layers in a single end-to-end model. The model is successively trained by considering linguistic hierarchies, directly connecting word representations to all model layers, explicitly using predictions in lower tasks, and applying a so-called "successive regularization" technique to prevent catastrophic forgetting. Three examples of lower level model layers are part-of-speech (POS) tagging layer, chunking layer, and dependency parsing layer. Two examples of higher level model layers are semantic relatedness layer and textual entailment layer. The model achieves the state-of-the-art results on chunking, dependency parsing, semantic relatedness and textual entailment.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 2B illustrates various tables that demonstrate that the use of the character n-gram embeddings results in improved processing of unknown words.

FIG. 4B includes a table that shows the results of POS tagging of the joint many-task neural network model.

FIG. 5B includes a table that shows the results of POS tagging of the joint many-task neural network model.

FIG. 6H shows two example sentences on which model applies dependency parsing.

FIG. 6I includes a table that shows the results of the dependency parsing layer of the model.

FIG. 7B includes a table that shows the results of the semantic relatedness task.

FIG. 8B includes a table that shows the results of the entailment task.

FIG. 9B includes a table that demonstrates the effectiveness of the successive regularization technique.

FIG. 10 includes a table that shows results of the test sets on the five different NLP tasks.

DETAILED DESCRIPTION

Figure 1:
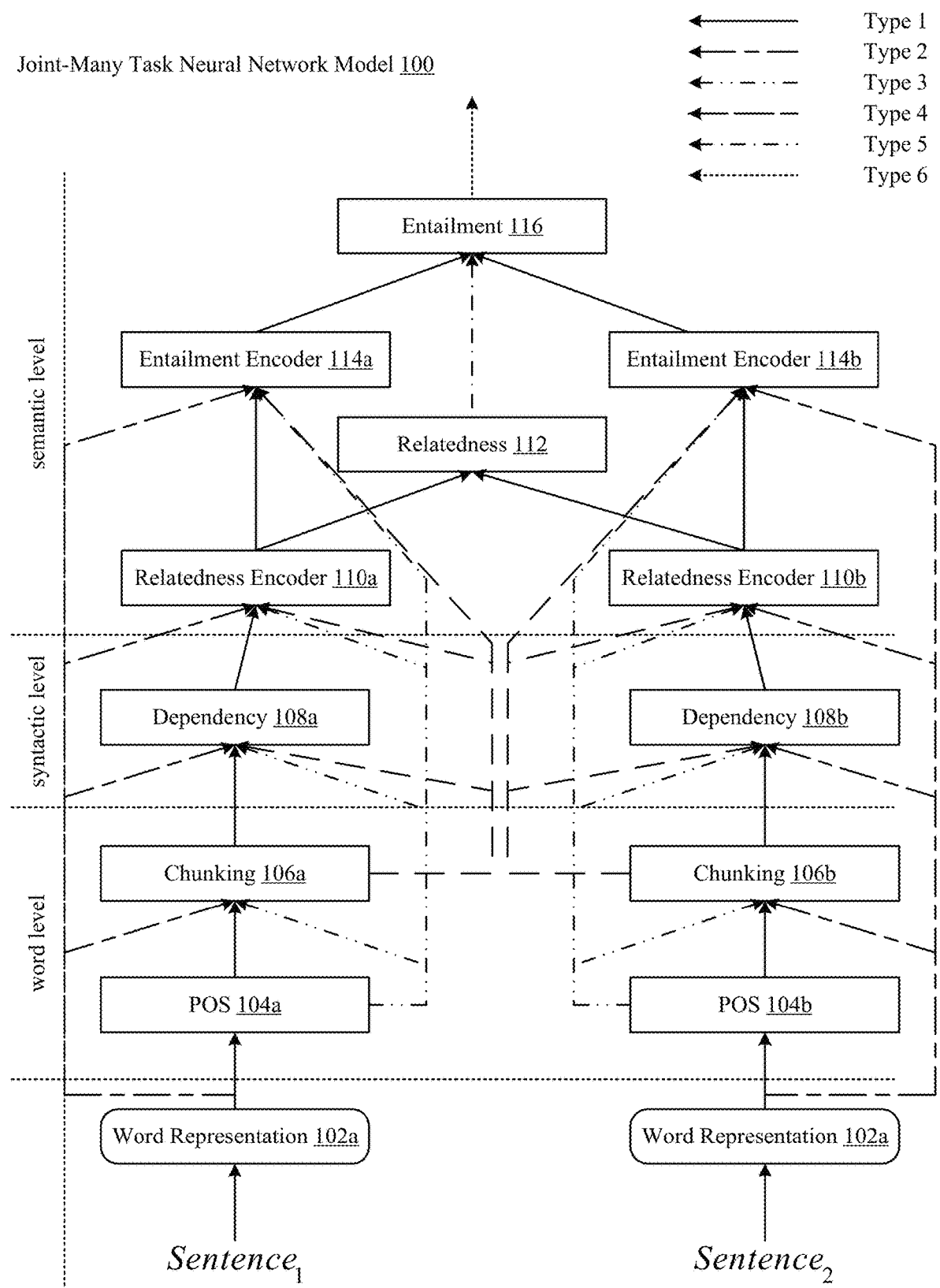
FIG. 1 illustrates aspects of a joint-many task neural network model that performs increasingly complex NLP tasks at successive layers.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Multiple levels of linguistic representation are used in a variety of ways in the field of Natural Language Processing (NLP). For example, part-of-speech (POS) tags are applied by syntactic parsers. The POS tags improve higher-level tasks, such as natural language inference, relation classification, sentiment analysis, or machine translation. However, higher level tasks are not usually able to improve lower level tasks, often because systems are unidirectional pipelines and not trained end-to-end.

In deep learning, supervised word and sentence corpuses are often used to initialize recurrent neural networks (RNNs) for subsequent tasks. However, not being jointly trained, deep NLP models have yet to show benefits from stacking layers of increasingly complex linguistic tasks. Instead, existing models are often designed to predict different tasks either entirely separately or at the same depth, ignoring linguistic hierarchies.

An overall theme of the technology disclosed is a so-called "joint many-task neural network model" that performs increasingly complex NLP tasks at successive layers. Unlike traditional NLP pipeline systems, the joint many-task neural network model is trained end-to-end for POS tagging, chunking, and dependency parsing. It can further be trained end-to-end on semantic relatedness, textual entailment, and other higher level tasks. In a single end-to-end implementation, the model obtains state-of-the-art results on chunking, dependency parsing, semantic relatedness and textual entailment. It also performs competitively on POS tagging. Additionally, the dependency parsing layer of the model relies on a single feed-forward pass and does not require a beam search, which increases parallelization and improves computational efficiency.

To allow the joint many-task neural network model to grow in depth while avoiding catastrophic forgetting, we also disclose a so-called "successive regularization" technique. Successive regularization allows multi-layer training of model weights to improve one NLP task's loss without exhibiting catastrophic interference of the other tasks. By avoiding catastrophic interference between tasks, the model allows the lower and higher level tasks to benefit from the joint training.

To improve generalization and reduce overfitting in the joint many-task neural network model, we further disclose a so-called "dimensionality projection" technique. Dimensionality projection includes projecting low-dimensional output of a neural network classifier into a high-dimensional vector space. This projection from a low-dimensional space to a high-dimensional space creates a dimensionality bottleneck that reduces overfitting.

To robustly encode the input words, especially unknown words, provided to the joint many-task neural network model, we disclose a "joint-embedding" technique. Joint-embedding includes representing an input word using a combination of word embedding of the word and character n-gram embeddings of the word. Joint-embedding efficiently encodes morphological features and information about unknown words.

Joint-Many Task Neural Network Model

FIG. 1 illustrates aspects of a joint-many task neural network model 100 that performs increasingly complex NLP tasks at successive layers. In implementations, model 100 is a stacked long-short-term-memory ("LSTM") sentence processor that is stacked in layers according to a linguistic hierarchy, with bypass connections that deliver input to underlying layers together with embedding outputs of the underlying layers to overlaying layers. The linguistic hierarchy builds from the words in the sentence (e.g., sentence$_1$ or sentence$_2$), to the parts of speech, to the chunks of the sentence, to dependency links between the words and their dependency parents, to labels on the dependency links. In the example shown in FIG. 1, model 100 includes two LSTM stacks (i.e., stack a and stack b) with similar architectures. In one implementation, model 100 includes just one LSTM stack. In another implementation, model 100 includes more than two LSTM stacks (e.g., 3, 4, 10, and so on).

In model 100, the stacked layers include a part-of-speech (POS) label embedding layer (e.g., 104a or 104b), a chunk/chunking label embedding layer (e.g., 106a or 106b) overlying the POS label embedding layer; and a dependency parent identification and dependency relationship label embedding layer (e.g., 108a or 108b) overlying the chunk label embedding layer.

The POS label embedding layer is implemented as a bi-directional LSTM that uses a POS label classifier. It processes word embedding vectors (e.g., 102a or 102b) representing the words in the input sentence and produces POS label embedding vectors and POS state vectors for each of the words.

The chunk label embedding layer is implemented as a bi-directional LSTM that uses a chuck label classifier. It processes at least the word embedding vectors, the POS label embedding vectors and the POS state vectors, to produce chunk label embeddings, and chunk state vectors.

The dependency parent identification and dependency relationship label embedding layer is implemented as a bi-directional LSTM that uses one or more classifiers. It processes the word embeddings, the POS label embeddings, the chunk label embeddings, and the chunk state vectors, to identify dependency parents of each of the words in the sentence to produce dependency relationship labels or label embeddings of relationships between the words and respective potential parents of the word.

Also, dimensionalities of the POS label embedding vectors, the chunk label embedding vectors, and the dependency relationship label embedding vectors are similar, within +/− ten percent.

In some implementations, model 100 includes an output processor that outputs at least results reflecting the identification of dependency parents and production of dependency relationship label embeddings for the words in the sentence. In the example shown in FIG. 1, relatedness encoders (e.g., 110a or 110b) can be considered outside processors that provide the dependency relationship label embeddings to a relatedness layer (e.g., 112). The relatedness layer provides a categorical classification of relatedness between the first and second sentences and delivers the classification to an entailment layer (e.g., 116) via entailment encoders (e.g., 114a or 114b). The entailment layer outputs a categorical classification of entailment between the first and second sentences. In implementations, the relatedness layer and the entailment layer are used as output processors.

Regarding the bypass connections, a bypass connection supplies an input vector used by an underlying layer to an overlaying layer without modification. In the example shown in FIG. 1, "type 2" bypass connections provide the word representations directly to each layer in the model 100. In another example of bypass connections, "type 3" bypass connections provide POS label embedding vectors generated at the POS label embedding layer to each of the overlaying layers. In another example of bypass connections, "type 4" bypass connections provide chunk label embeddings generated at the chunk label embedding layer to each of the overlaying layers.

Model 100 also includes connections that deliver information from an underlying layer to only the successive overlaying layer. For instance, "type 5" connection provides a categorical classification of relatedness between the first and second sentences calculated at the semantic relatedness layer to the entailment layer. "Type 6" connection outputs a categorical classification of entailment between the first and second sentences from the entailment layer. Also, "type 1" connections provide hidden state vectors generated at a given layer only to the successive overlaying layer.

The components in FIG. 1 can be implemented in hardware or software, and need not be divided up in precisely the same blocks as shown in FIG. 1. Some of the components can also be implemented on different processors or computers, or spread among a number of different processors or computers. In addition, it will be appreciated that some of the components can be combined, operated in parallel or in a different sequence than that shown in FIG. 1 without affecting the functions achieved. Also as used herein, the term "component" can include "sub-components", which themselves can be considered herein to constitute components. For example, the POS label embedding layer and the chunk label embedding layer can also be considered herein to be sub-components of a "word level processor" component. Similarly, the dependency parent identification and dependency relationship label embedding layer can also be considered herein to be a sub-component of a "syntactic level processor" component. Likewise, the semantic relatedness layer and the entailment layer can also be considered herein to be sub-components of a "semantic level processor" component. Furthermore, the blocks in FIG. 1 can also be thought of as flowchart steps in a method. A component or sub-component also need not necessarily have all its code disposed contiguously in memory; some parts of the code can be separated from other parts of the code with code from other components or sub-components or other functions disposed in between.

In some implementations, model 100 is a stacked LSTM token sequence processor, stacked in layers according to an analytical hierarchy, with bypass connections that deliver input to underlying layers together with embedding outputs of the underlying layers to overlaying layers. In such implementations, the stacked layers of the model 100 include a first embedding layer, a second embedding layer overlying the first embedding layer, and a third embedding layer overlying the second embedding layer.

In one implementation, the first embedding layer of the model 100, implemented as a bi-directional LSTM and a first label classifier, processes token embeddings representing the tokens in the input sequence, and produces first embeddings and first state vectors of the tokens. In one implementation, the second embedding layer of the model 100, implemented as a bi-directional LSTM and a second label classifier, processes at least the token embeddings, the first label embeddings and first state vectors, to produce second label embeddings and second state vectors. In one implementation, the third embedding layer of the model 100, implemented as a bi-directional LSTM, processes at least the token embeddings, the first label embeddings, the second label embeddings and the second state vectors to produce third label embeddings and third state vectors. In one implementation, an output processor of the model 100 outputs at least results reflecting the third label embeddings for the tokens in the input sequence.

In some implementations, the first embedding layer further produces first label probability mass vectors, by exponential normalization of the first state vectors, and produces the first label embedding vectors, from the first label probability mass vectors. In some implementations, the second embedding layer further produces second label probability mass vectors, by exponential normalization of the second state vectors, and produces the second label embedding vectors from the second label probability mass vectors. In some implementations, the third embedding layer further produces third label probability mass vectors, by exponential normalization of the third state vectors, and produces the third label embedding vectors from the third label probability mass vectors. In implementations, dimensionalities of the first label embedding vectors, the second label embedding vectors, and the third label embedding vectors are similar, within +/− ten percent.

In one implementation, model 100 includes a token embedding processor, underlying the first label embedding layer, that includes a token embedder and a decomposed token embedder. The token embedder maps the tokens in the sequence, when recognized, into a token embedding space represented by a token embedding vector. The decomposed token embedder processes token decompositions of the token at multiple scales, maps each processed token decomposition into an intermediate vector representing a position in a token decomposition embedding space, and combines the intermediate vectors for each unique processed token decomposition to produce token decomposition embedding vectors for each of the tokens. The token embedding processor combines results of the token embedder and the decomposed token embedder, whereby a token not previously mapped into the token embedding space is nonetheless represented by the token decomposition embedding vector.

Joint-Embedding

Figure 2A:
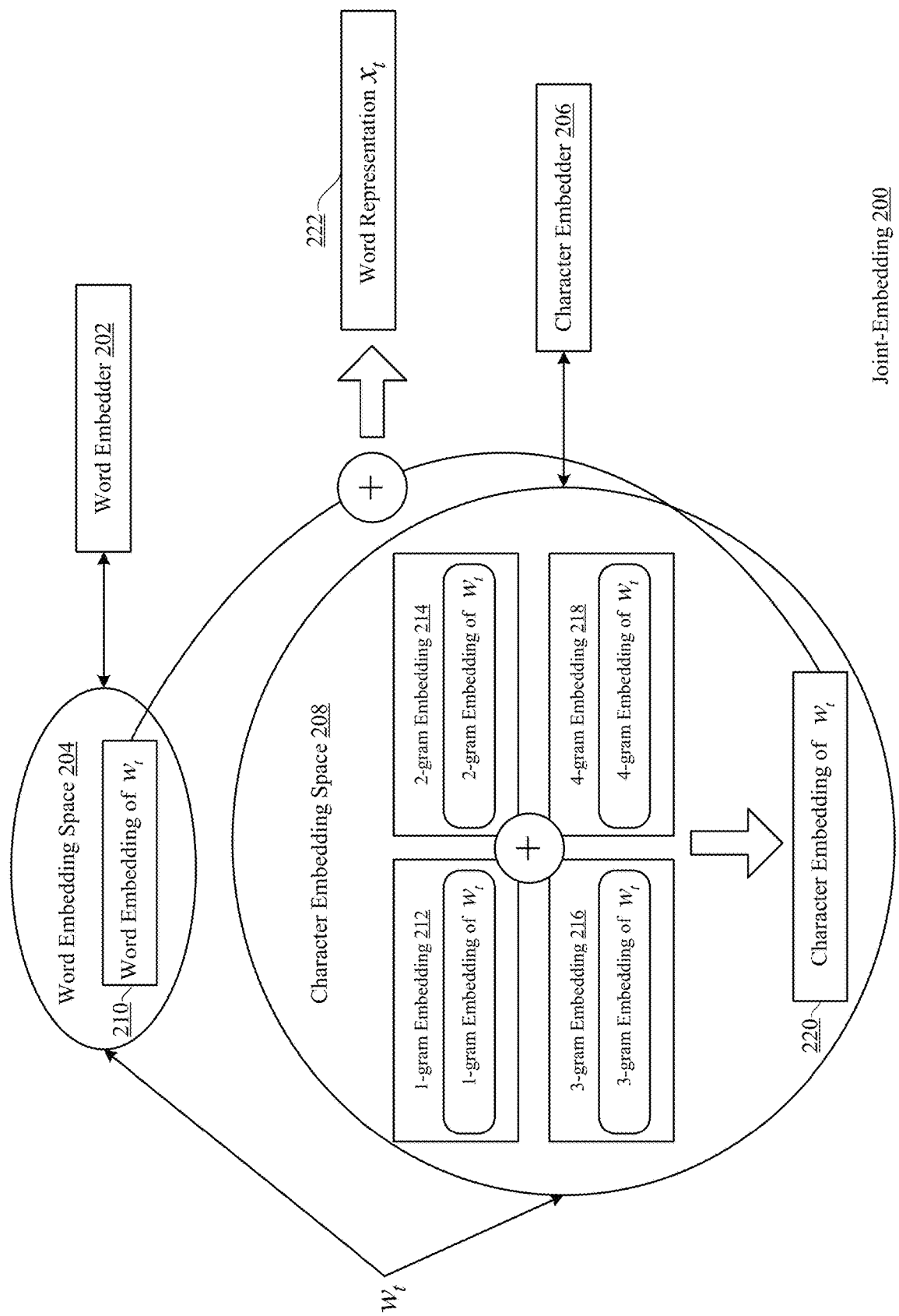
FIG. 2A depicts a joint-embedding technique that is herein used to robustly encode the input words, especially unknown words.

FIG. 2A depicts a joint-embedding technique 200 used to robustly encode the input words, especially unknown words. Joint-embedding includes, for each word $w_t$ in the input sequence S of length L, constructing a so-called "word representation" 222 by concatenating a word embedding 210 of the word $w_t$ and one or more character n-gram embeddings of the word $w_t$, also referred to herein as "n-character-gram" embeddings. In FIG. 2A, the concatenation operation is denoted by the "+" symbol.

Regarding the word embeddings, model 100 includes a word embedder 202 that trains a word embedding matrix to create a word embedding space 204. In one implementation, the word embedder 202 uses a skip-gram model to train the word embedding matrix. In another implementation, it uses a continuous bag-of-words (CBOW) model to train the word embedding matrix. In implementations, the word embedding matrix is shard across all the NLP tasks of the model 100. In some implementations, the words which are not included in the vocabulary are mapped to a special "UNK" token.

Regarding the character n-gram embeddings, model 100 includes a character embedder 206 that trains a character embedding matrix to create a character embedding space 208. In one implementation, the character embedder 206 uses a skip-gram model to train the word embedding matrix. In another implementation, it uses a continuous bag-of-words (CBOW) model to train the character embedding matrix. In implementations, the character n-gram embeddings are learned using the same skip-gram objective function as the word vectors.

Character embedder 206, also referred to herein as an "n-character-gram embedder", constructs the vocabulary of the character n-grams in the training data and assigns an embedding for each character n-gram. In the example shown in FIG. 2, the character embedding space 208 includes a 1-gram embedding 212, a 2-gram embedding 214, a 3-gram embedding 216, and a 4-gram embedding 218. In other implementations, it includes embeddings for different, additional, and/or fewer n-grams.

The final character embedding 220 combines, element-wise, vectors representing the unique character n-gram embeddings of the word $w_t$. For example, the character n-grams (n=1, 2, 3) of the word "Cat" are {C, a, t, # BEGIN # C, Ca, at, t # END # , # BEGIN # Ca, Cat, at # END # }, where "# BEGIN #" and "# END #" represent the beginning and the end of each word, respectively. Element-wise combination of vectors representing these substrings can be element-wise averages or maximum values. The use of the character n-gram embeddings efficiently provides morphological features and information about unknown words. Accordingly, each word is represented as word representation $x_t$ 222, the concatenation of its corresponding word embedding 210 and character embedding 220.

In implementations, the word embedder 202 and the character embedder 206 are part of a so-called "word embedding processor". The POS label embedding layer overlays the word embedding processor. The word embedder 202 maps the words in the sentence, when recognized, into the word embedding space 204 represented by a word embedding vector. The n-character-gram embedder 206 processes character substrings of the word at multiple scales of substring length, maps each processed character substring into an intermediate vector representing a position in the character embedding space 208, and combines the intermediate vectors for each unique processed character substring to produce character embedding vectors for each of the words. The word embedding processor combines results of the word embedder 202 and the n-character-gram embedder 206, whereby a word not previously mapped into the word embedding space is nonetheless represented by the character embedding vector. The handling of unknown or out-of-vocabulary (OoV) words applies well to other NLP tasks, such as question answering.

In some implementations, the n-character-gram embedder 206 combines the intermediate vectors to produce element wise average in the character embedding vector.

The POS label embedding layer further processes n-character-gram embedding vectors that represent the words in the input sentence, in addition to the word embedding vectors, and the bypass connections further deliver the n-character-gram embedding vectors to the chunk label embedding layer and the dependency parent and dependency relationship label embedding layer as input to respective bi-directional LSTMs in those overlaying layers.

In regards to training, the word embeddings are trained using the skip-gram or the CBOW model with negative sampling, according to one implementation. The character n-gram embeddings are also trained similarly. In some implementations, one difference between the training of the word embeddings and the character n-gram embeddings is that each input word in the skip-gram model is replaced with its corresponding average embedding of the character n-gram embeddings. Also, these embeddings are fine-tuned during the joint training of the model 100 such that, during backpropagation, the gradients are used to update corresponding character n-gram embeddings. The embedding parameters are denoted as "$\theta_e$".

In one implementation, the vocabulary of the character n-grams is built on the training corpus, the case-sensitive English Wikipedia text. Such case-sensitive information is important in handling some types of words like named entities. Assuming that the word $w_t$ has its corresponding K character n-grams {$cn_1$, $cn_2$, ..., $cn_K$}, where any overlaps and unknown entries are removed. Then, the word $w_t$ is represented with an embedding $V_c(W)$, computed as follows:

$$v_c(w) = \frac{1}{K}\sum_{i=1}^{K} v(cn_i),$$

where $v(cn_i)$ is the parameterized embedding of the character n-gram $cn_i$.

Furthermore, for each word-context pair $(W, \bar{w})$ in the training corpus, N negative context words are sampled, and the objective function is defined as follows:

$$\sum_{(w,\bar{w})} \{-\log\sigma(v_c(w)\cdot\tilde{v}(\bar{w})) - \sum_{i=1}^{N}\log\sigma(-v_c(w)\cdot\tilde{v}(\bar{w}_i))\},$$

where $\sigma(\cdot)$ is the logistic sigmoid function, $\tilde{v}(\bar{w})$ is the weight vector for the context word, and $\bar{w}$ is a negative sample.

FIG. 2B illustrates various tables that demonstrate that the use of the character n-gram embeddings results in improved processing of unknown words. This is demonstrated in table 224 of FIG. 2B, which shows the results for the three single tasks, POS tagging, chunking, and dependency parsing, with and without the pre-trained character n-gram embeddings. The column of "W&C" corresponds to using both of the word and character n-gram embeddings, and that of "Only W" corresponds to using only the word embeddings. These results clearly show that jointly using the pre-trained word and character n-gram embeddings is helpful in improving the results. The pre-training of the character n-gram embeddings is also effective; for example, without the pre-training, the POS accuracy drops from 97.52% to 97.38% and the chunking accuracy drops from 95.65% to 95.14%, but they are still better than those of using word2vec embeddings alone.

Table 226 of FIG. 2B shows that the joint use of the word and the character n-gram embeddings improves the score by about 19% in terms of the accuracy for unknown words. Table 228 of FIG. 2B shows dependency parsing scores on the development set with and without the character n-gram embeddings, focusing on UAS and LAS for unknown words. UAS stands for unlabeled attachment score. LAS stands for labeled attachment score. UAS studies the structure of a dependency tree and assesses whether the output has the correct head and dependency relationships. In addition to the structure score in UAS, LAS also measures the accuracy of the dependency labels on each dependency relationship. Table 228 clearly indicates that using the character-level information is effective, and in particular, the improvement of the LAS score is large.

Dimensionality Projection

Figure 3:
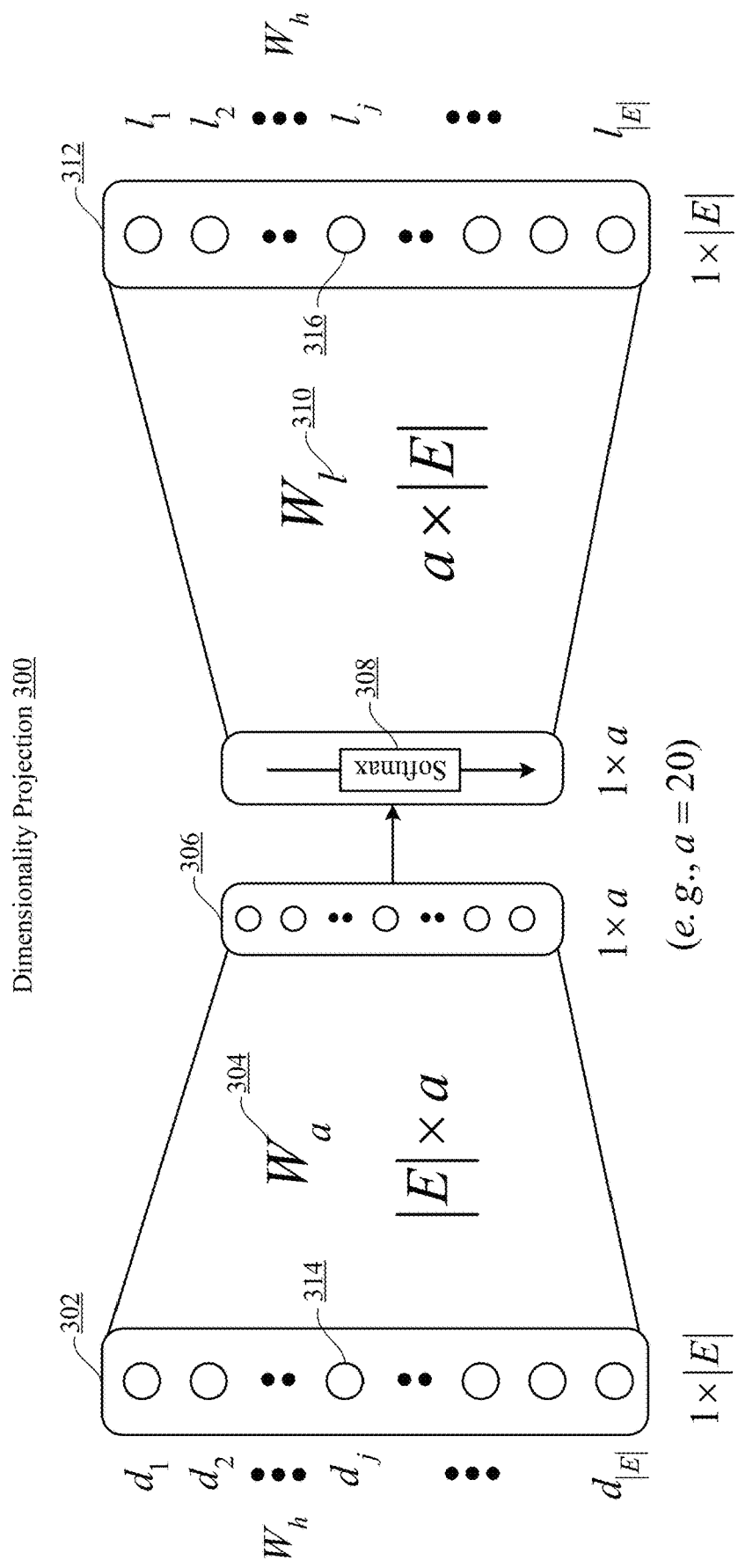
FIG. 3 shows one implementation of dimensionality projection.

FIG. 3 shows one implementation of dimensionality projection 300. Dimensionality projection includes conveying intermediate results from an underlying layer to an overlying layer in a neural network stack of bidirectional LSTMs, in which the stack has layers corresponding to an analytical framework that process a sequence of tokens, and the underlying layer produces analytic framework label vectors for each of the tokens.

In FIG. 3, the hidden state vectors 314 are generated by a neural network, such as a LSTM or bidirectional LSTM, or any other RNN. Hidden state vectors 314 are encoded in a high dimensional vector space 302 and have a dimensionality of 1×|E|, which is identified element-wise as $d_1, d_2, \ldots, d_j, \ldots, d_{|E|}$,} such that d represents an individual dimension and the sub-script denotes an ordinal position of the dimension. In one example, |E|=200. In one implementation, a classifier 304 classifies the hidden state vectors 314 into an analytic framework label space 306 as label space vectors that have dimensionality about the same as a number of available framework labels. The analytic framework label space 306 encodes linguistic meaningfulness. For instance, if the POS label embedding layer has twenty labels, then a=20. In one implementation, the classifier 304 just includes a dimensionality reduction matrix $W_a$. In another implementation, the classifier 304 includes an exponential normalizer 308 (e.g., softmax) in addition to the dimensionality reduction weight matrix $W_a$, which normalizes the label space vectors produced by the dimensionality reduction weight matrix $W_a$.

Once created, the low dimensional label space vectors are projected into an extended dimensionality label space 312 by a dimensionality augmentation weight matrix $W_l$ 310 to produce extended token label vectors 316. The extended dimensionality label space 312 is a high dimensional vector space. Thus, like the hidden state vectors 314, the label vectors 316 are also mapped to a high dimensional vector space and have a dimensionality of 1×|E|, which is identified element-wise as $\{l_1, l_2, \ldots, l_j, \ldots, l_{|E|}\}$ such that 1 represents an individual dimension and the sub-script denotes an ordinal position of the dimension. Note that the label vectors 316 have dimensionality about the same as dimensionality of the hidden state vectors 314. By about the same, we mean within +/− ten percent. It is not necessary that the dimensionality be the same, but programming can be easier when they are.

Model 100 uses dimensionality projection at various stages of processing. In one implementation, it uses it to project the POS label embeddings in a higher dimensional space such that low dimensional POS analytic label space vectors are projected into a vector space where they have the same dimensionality as the POS hidden state vectors used to generate them. In another implementation, model 100 uses dimensionality projection to project the chunk label embeddings in a higher dimensional space such that low dimensional chunk analytic label space vectors are projected into a vector space where they have the same dimensionality as the chunk hidden state vectors used to generate them. Likewise, in other implementations, other layers use dimensionality projection.

In one implementation, when the number of available analytical framework labels is one-fifth or less the dimensionality of the hidden state vectors 314, the label space vectors 316 serve as dimensionality bottleneck that reduce overfitting when training the model 100. In another implementation, when the number of available analytical framework labels is one-tenth or less the dimensionality of the hidden state vectors 314, the label space vectors 316 serve as dimensionality bottleneck that reduce overfitting when training the model 100.

The dimensionality bottleneck also improves processing in other NLP tasks such as machine translation.

Word-Level Task—POS Tagging

Figure 4A:
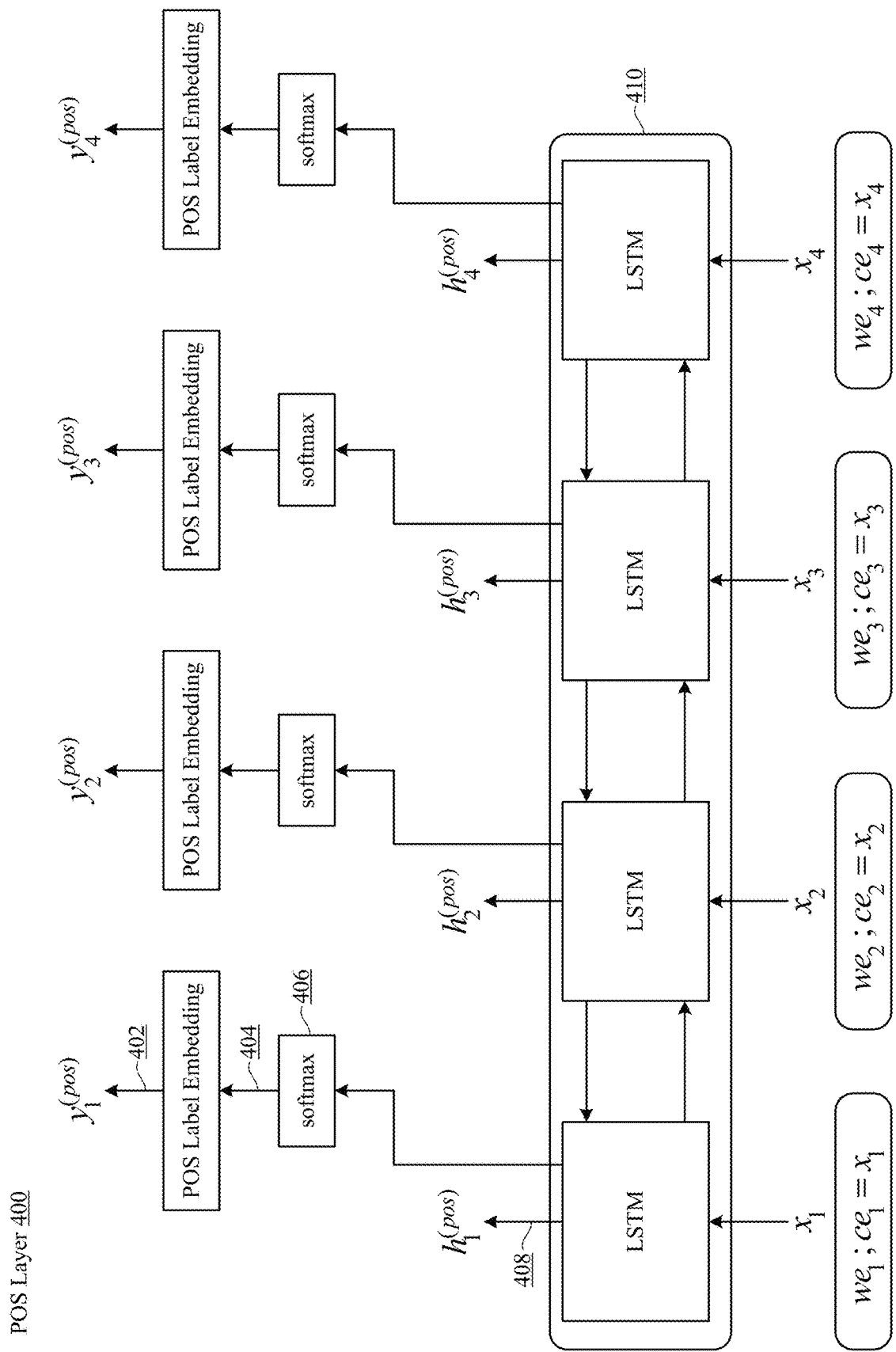
FIG. 4A shows one implementation of operation of a POS layer of the joint many-task neural network model.

FIG. 4A shows one implementation of operation of a POS layer 400 of the model 100.

The POS label embedding layer, also referred to herein as the "POS layer", produces POS label probability mass vectors (e.g., 404), by exponential normalization (e.g., softmax 406 with a single ReLU layer) of the POS state vectors (e.g., 408), and produces the POS label embedding vectors (e.g., 402), from the POS label probability mass vectors.

In one implementation, the POS label embedding layer 400 of the model 100 is a bi-directional LSTM 410, whose hidden states are used to predict POS tags. In one implementation, the following LSTM units are used for the forward pass direction:

$i_t = \sigma(W_i g_t + b_i),$ $f_t = \sigma(W_f g_t + b_f),$ $o_t = \sigma(W_o g_t + b_o),$ $u_t = \tan h(W_u g_t + b_u),$ $c_t = i_t \odot u_t + f_t \odot c_{t-1},$ $h_t = o_t \odot \tan h(c_t),$ where the input $g_t$ is defined as $g_t = [\vec{h}_{t-1}; x_t]$, i.e., the concatenation of the previous hidden state and the word representation $x_t$. The backward pass of the LSTM over words is expanded in the same way, but with a different set of weights.

For predicting the POS tags of $w_t$, the concatenation of the forward and backward states is used in a one-layer bi-LSTM layer corresponding to the t-th word: $h_t^{pos} = [\vec{h}_t^{pos}; \overleftarrow{h}_t^{pos}]$. Then each $h_t (1 \leq t \leq L)$ is fed into an exponential normalizer with a single ReLU layer which outputs the probability vector $y^{(pos)}$ for each of the POS tags.

FIG. 4B includes a table that shows the results of POS tagging of the model 100. Model 100 achieves the score close to the state-of-the art results.

Word-Level Task—Chunking

Figure 5A:
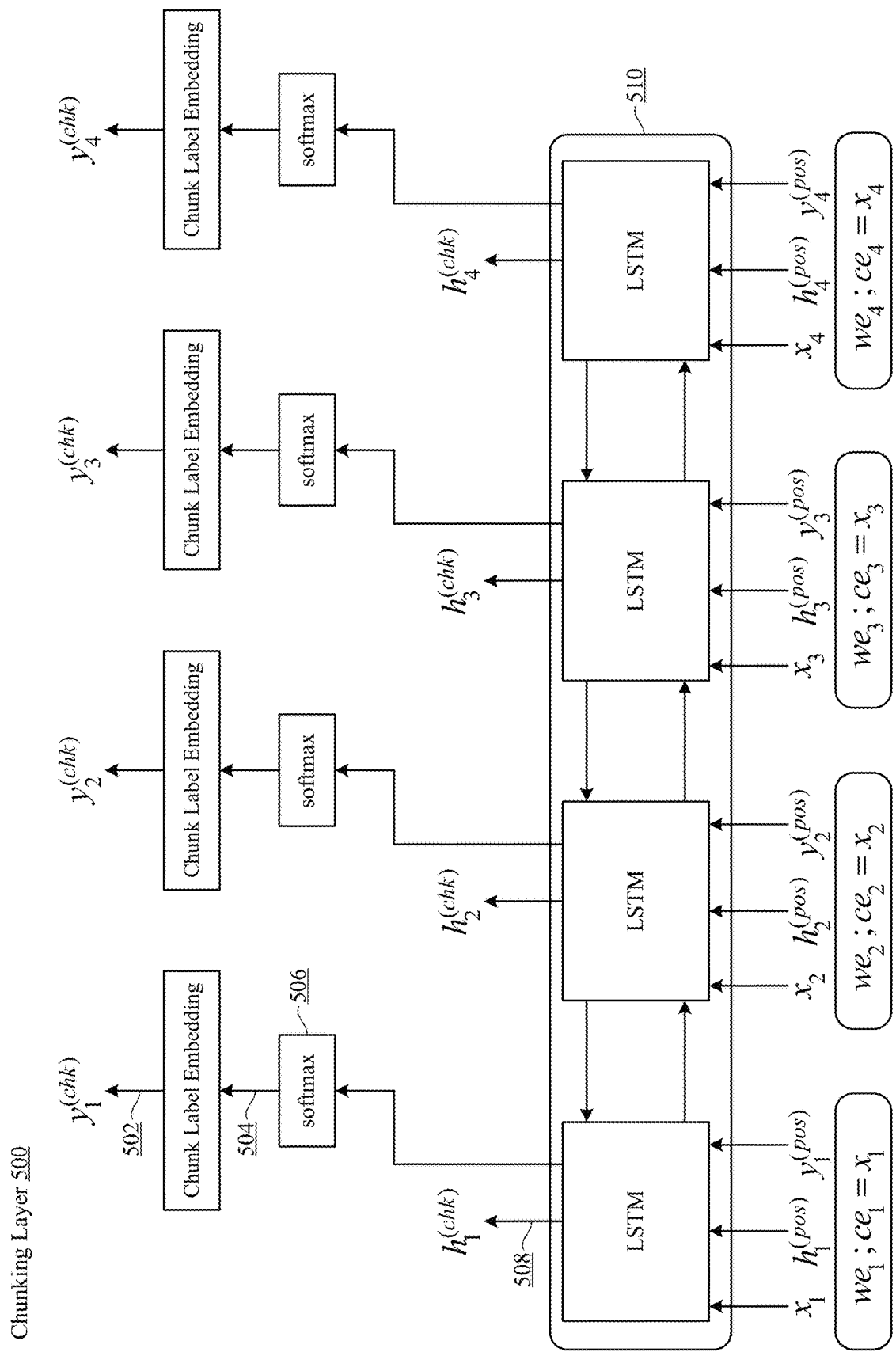
FIG. 5A shows one implementation of operation of a chunking layer of the joint many-task neural network model.

FIG. 5A shows one implementation of operation of a chunking layer 500 of the model 100.

Chunking is also a word-level classification task which assigns a chunking tag (B-NP, I-VP, etc.) for each word. The tag specifies the region of major phrases (or chunks) in the sentence.

The chunk label embedding layer 500, also referred to herein as the "chunking layer", further produces chunk label probability mass vectors (e.g., 504), by exponential normalization (e.g., softmax 506 with a single ReLU layer) of the chunk label state vectors (e.g., 508), and produces the chunk label embedding vectors (e.g., 502 from the chunk label probability mass vectors.

In model 100, chunking is performed using a second bi-LSTM layer 510 on top of the POS layer. When stacking the bi-LSTM layers, the LSTM units are provided with the following input:

$$g_t^{chk} = [h_{t-1}^{chk}; h_t^{pos}; x_t; y_t^{pos}],$$

where $h_t^{pos}$ is the hidden state of the first POS layer. The weight label embedding $y_t^{pos}$ is defined as follows:

$$y_t^{pos} = \sum_{j=1}^{C} p(y_t^{pos} = j \mid h_t^{pos}) l(j), \quad (1)$$

where C is the number of the POS tags, p $(y_t^{pos}=j|h_t^{pos})$ is the probability mass for the j-th POS tag is assigned to word $w_t$, and l (i) is the corresponding label embedding. As previously discussed, the label embedding can be at a higher dimensionality than the probability mass. The probability values are automatically predicted by the POS label embedding layer working like a built-in POS tagger, and thus no gold POS tags are needed, in some implementations.

For predicting the chunking tags, similar strategy as POS tagging is employed by using the concatenated bi-directional hidden states $h_t^{chk} = [\vec{h}_t^{chk}; \overleftarrow{h}_t^{chk}]$ in the chunking layer. In some implementations, a single ReLU hidden layer is used before the exponential classifier.

FIG. 5B includes a table that shows the results of POS tagging of the model 100. Model 100 achieves the state-of-the art results, which show that the lower level tasks are also improved by the joint learning in addition to the higher level tasks.

Syntactic Task—Dependency Parsing

Figure 6A:
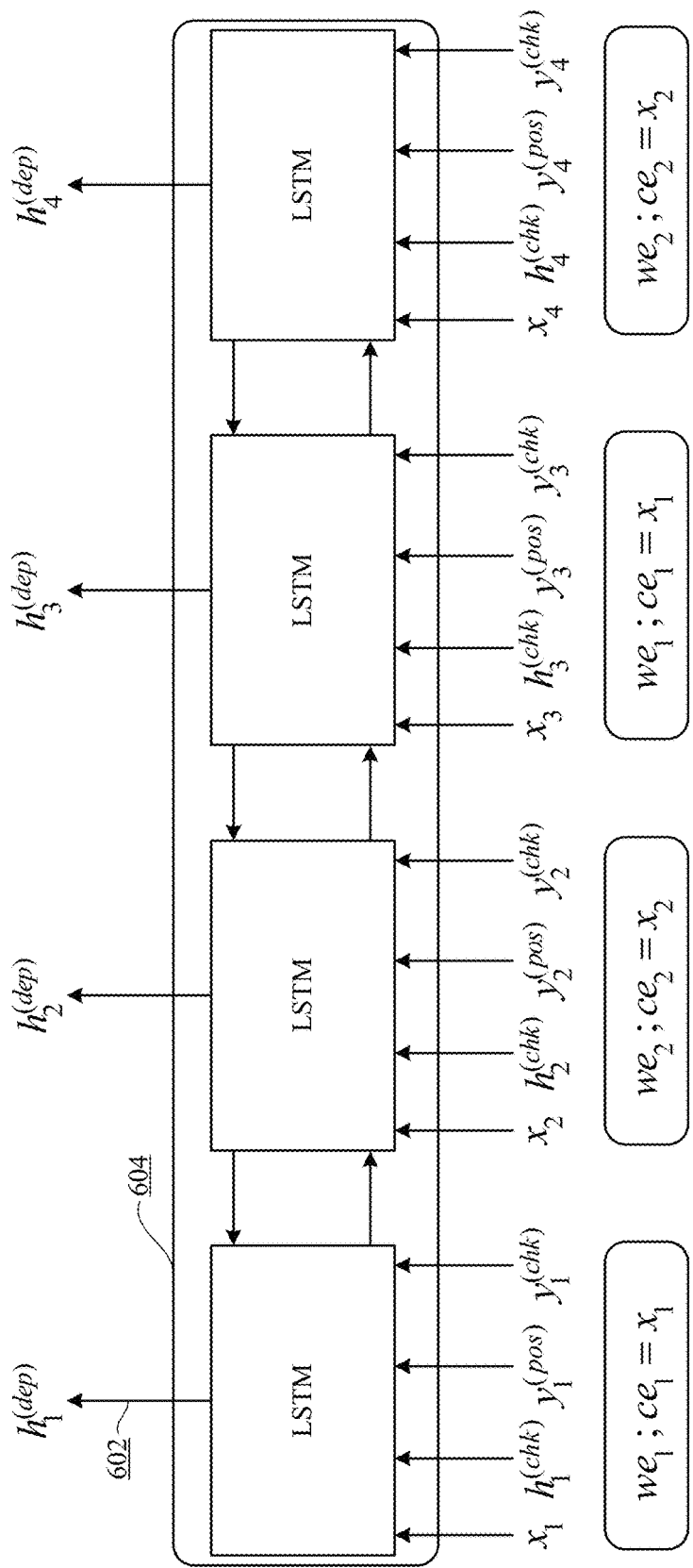
FIG. 6A shows one implementation of operation of a dependency parsing layer.
Figure 6B:
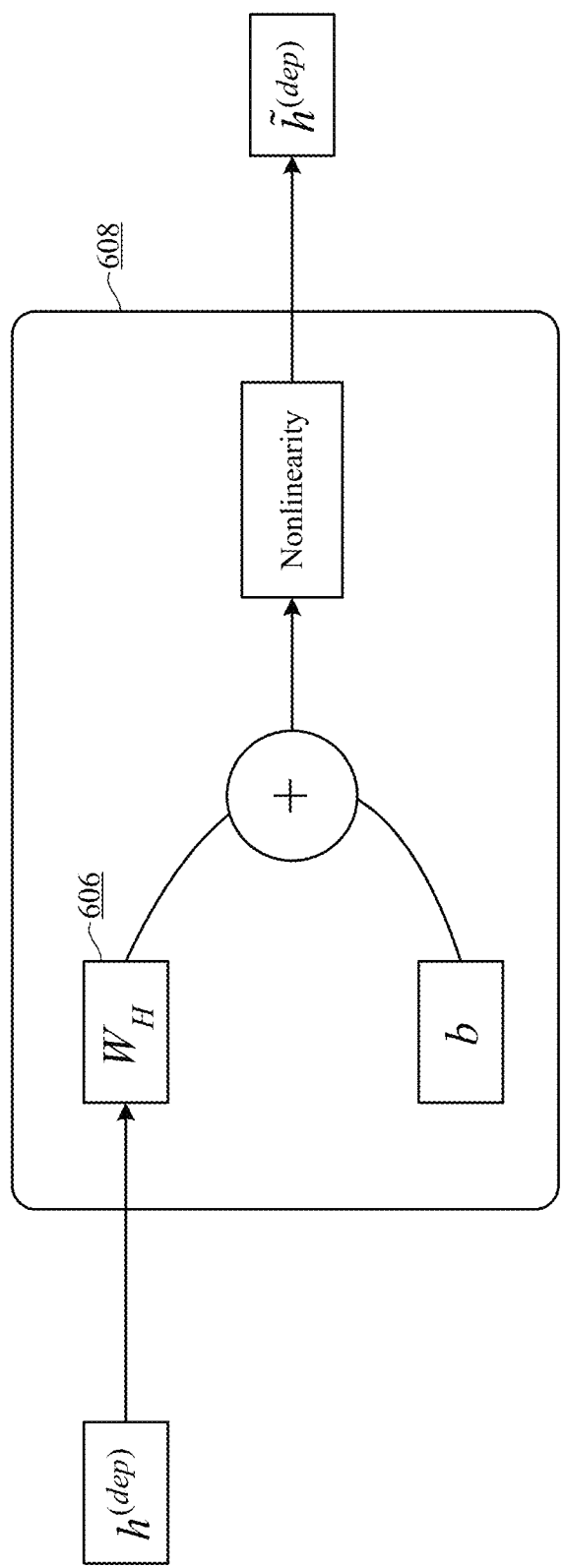
FIGS. 6B, 6C, 6D, 6E, and 6F show one implementation of operation of an attention encoder of the dependency parsing layer.
Figure 6C:
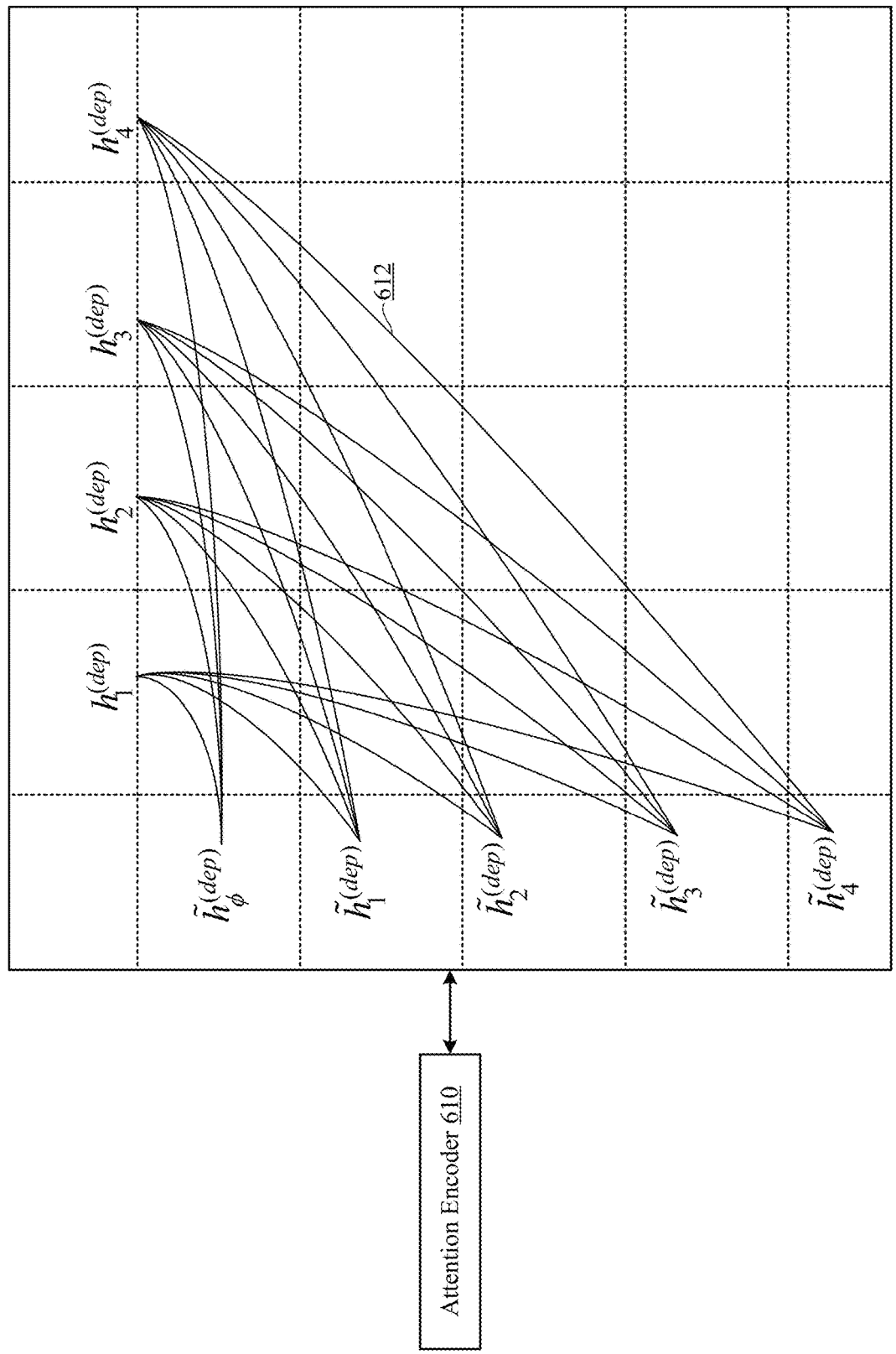
Figure 6D:
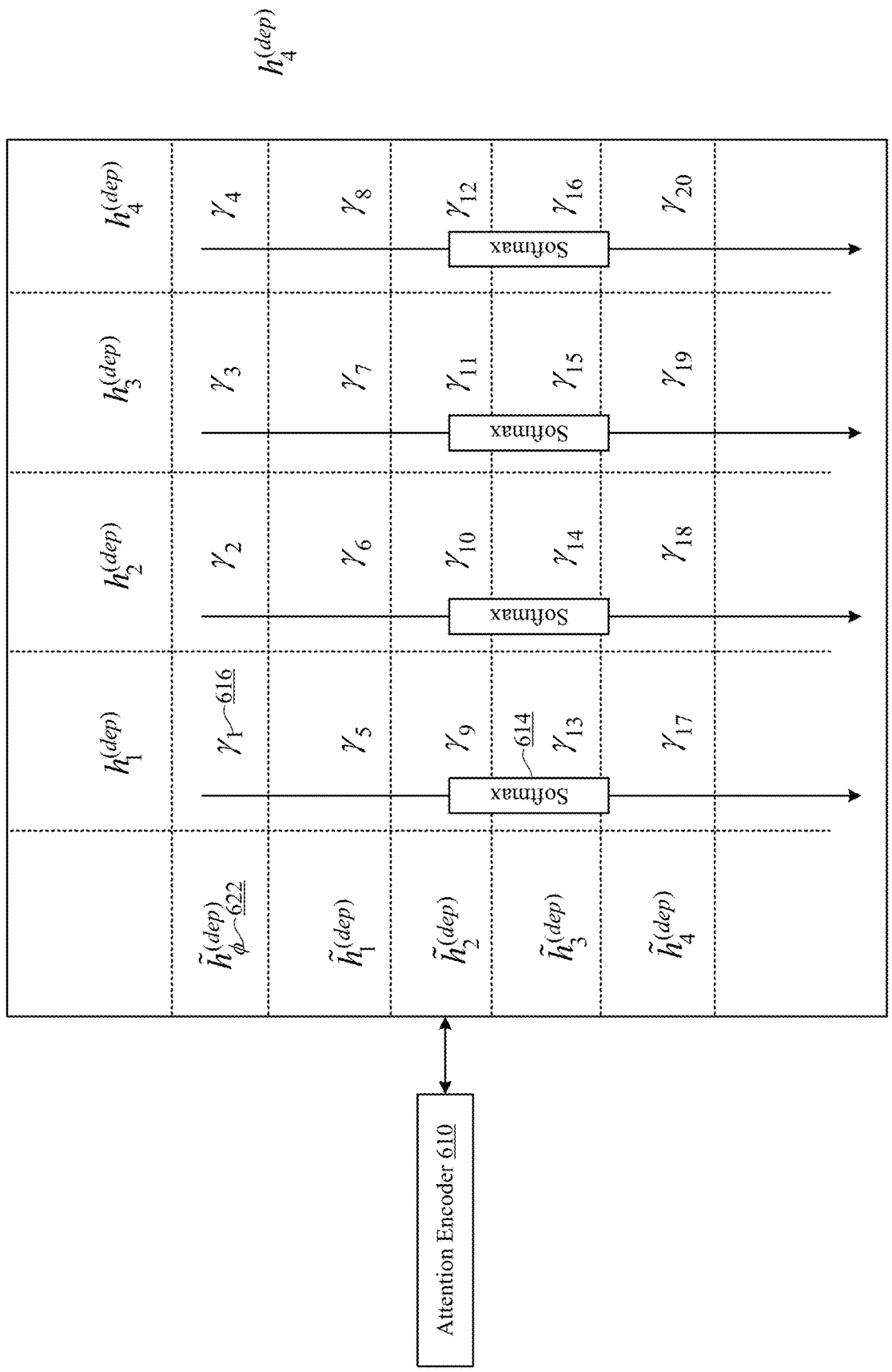
Figure 6E:
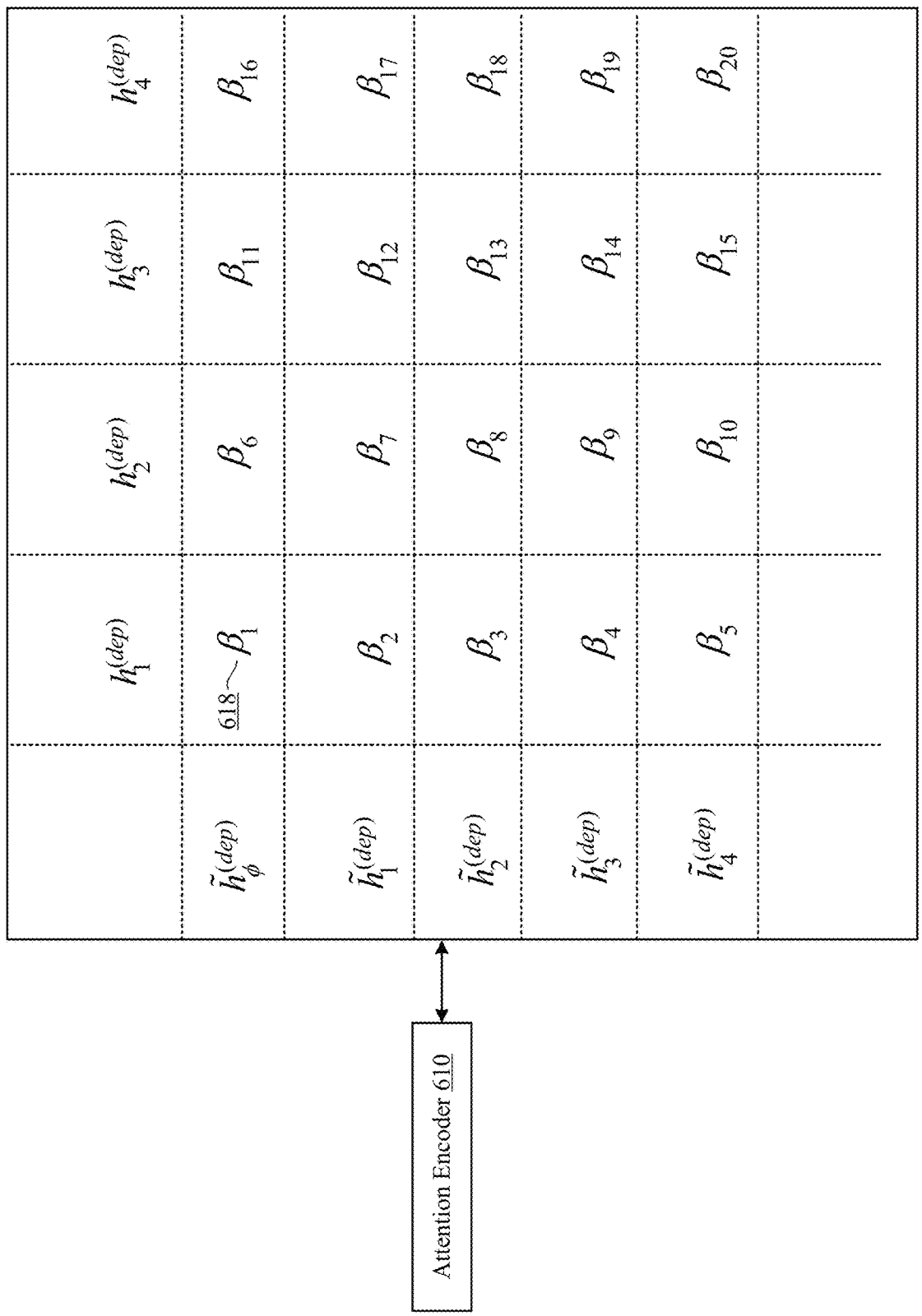
Figure 6F:
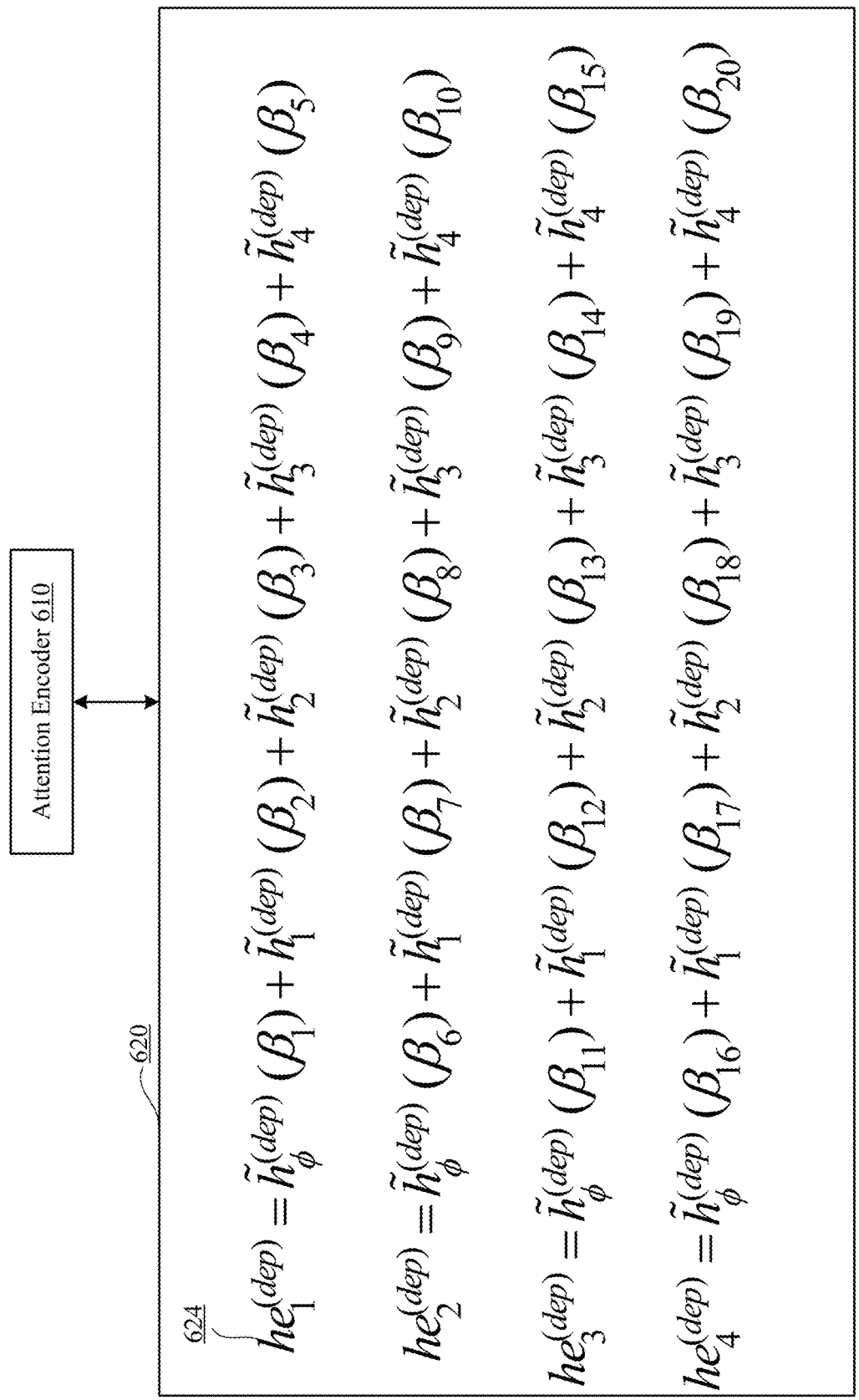

FIG. 6A shows one implementation of operation of a dependency parsing layer 600 of the model 100.

Dependency parsing identifies syntactic relationships (such as an adjective modifying a noun) between pairs of words in a sentence.

The dependency parent identification and dependency relationship label embedding layer 600, also referred to herein as the "dependency layer or dependency parsing layer", produces parent label probability mass vectors by classification and exponential normalization of parent label state vectors 602 produced by the bi-directional LSTM 604, also referred to herein as the "dependency parent analyzer". The dependency parsing layer produces the parent label embedding vectors from the parent label probability mass vectors, produces dependency relationship label probability mass vectors by classification and exponential normalization of the parent label state vectors and the parent label embedding vectors, and produces the dependency relationship label embedding vectors from the dependency relationship label probability mass vectors.

The dependency parent analyzer 604 processes the words in the input sentences, including processing, for each word, word embeddings, the POS label embeddings, the chunk label embeddings, and the chunk state vector to accumulate forward and backward state vectors 602 that represent forward and backward progressions of interactions among the words in the sentence.

FIGS. 6B, 6C, 6D, 6E, and 6F show one implementation of operation of an attention encoder 610 of the dependency parsing layer 600. The attention encoder 610 processes the forward and backward state vectors 602 for each respective word in the sentence to encode attention as inner products 612 between each respective word and other words in the sentence, after applying a linear transform 608 to the forward and backward state vectors 602 for the word or the other words, whereby weights 606 in the linear transform are trainable. In some implementations, a sentinel vector 622 is used by the attention encoder 610 to encode the root word.

The attention encoder 610 further applies exponential normalization 614 to vectors 616 of the inner products 612 to produce parent label probability mass vectors 618 and projects the parent label probability mass vectors to produce parent label embedding vectors by mixing or calculating a weighted sum 620 of the linear transformations of the forward and backward state vectors 602 in dependence upon the parent label probability mass vectors 618.

Figure 6G:
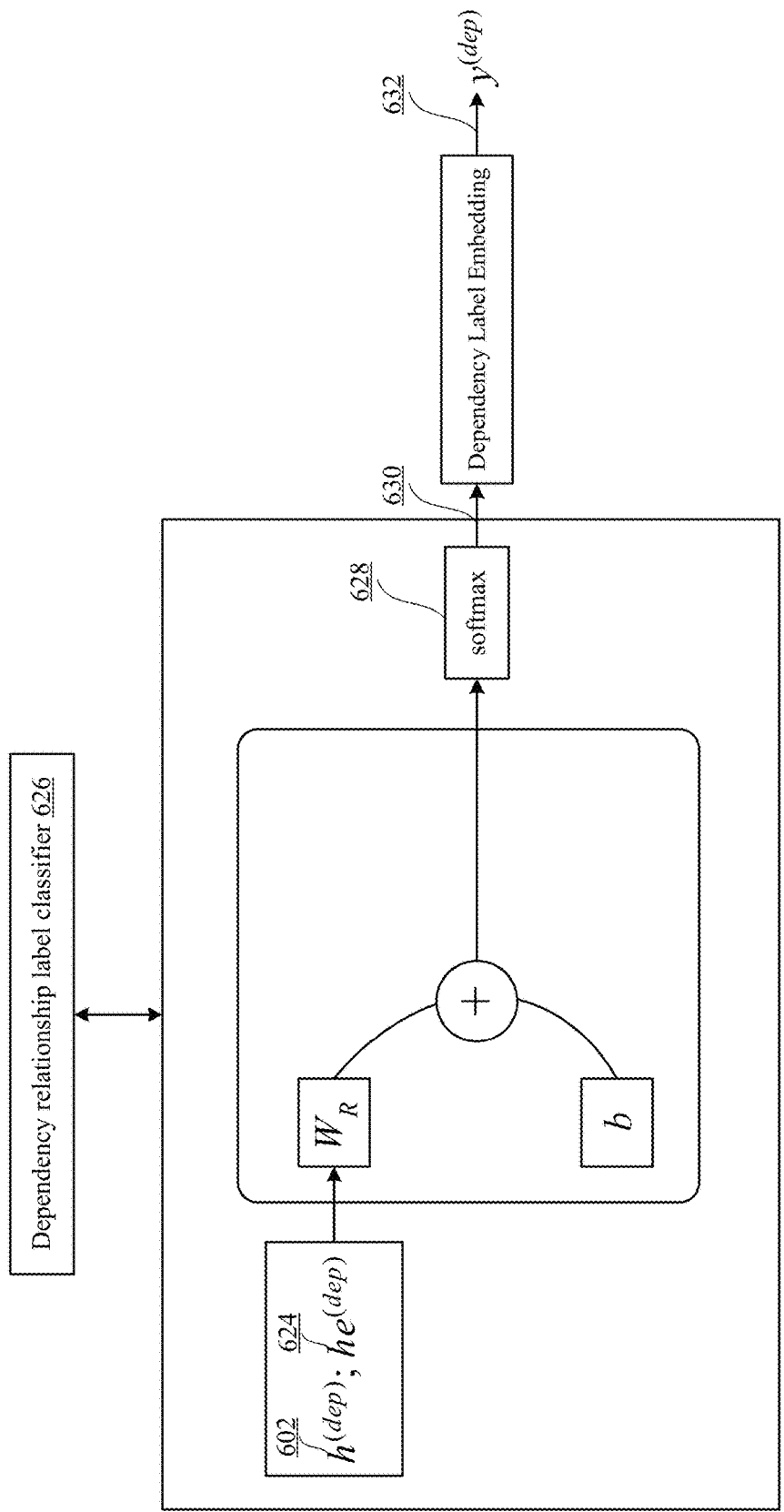
FIG. 6G shows one implementation of operation of a dependency relationship label classifier of the dependency parsing layer.

FIG. 6G shows one implementation of operation of a dependency relationship label classifier 626 of the dependency parsing layer. The dependency relationship label classifier 626, for each respective word in the sentence, classifies and normalizes (using another exponential normalizer such as softmax 628) the forward and backward state vectors 602 and the parent label embedding vectors 624, to produce dependency relationship label probability mass vectors 630, and projects the dependency relationship label probability mass vectors 630 to produce dependency relationship label embedding vectors 632.

As discussed above, for dependency parsing, model 100 uses a third bi-LSTM layer 604 on top of the POS and chunking layers to classify relationships between all pairs of words. As shown in FIG. 6A, the input vector for the dependency parsing LSTM includes hidden states, word representations 102, and the label embeddings 402 and 502 for the two previous tasks:

$$g_t^{dep} = [h_{t-1}^{dep}; h_t^{chk}; x_t; (y_t^{pos} + y_t^{chk})],$$

where the chunking vector is computed in a similar fashion as the POS vector in equation (1) above. The POS and chunking tags 402 and 502 are used to improve dependency parsing.

Like sequential labeling task, model 100 predicts the parent node, also referred to herein as "head", for each word in the sentence. Then, a dependency label is predicted for each of the child-parent node pairs. To predict the parent node of the t-th of the word $w_t$, model 100 defines a matching function 612 (based on dot product/inner product or bi-linear product) between $w_t$ and the candidates of the parent node as:

$$m(t,j) = h_t^{dep\,T} W_d h_j^{dep},$$

where $W_d$ is a parameter matrix. As discussed above, for the root, model 100 defines $h_{L+1}^3 = r$ as a parameterized sentinel vector 622. As discussed above, to compute the probability that $w_j$ (or the root node) is the parent of $w_t$, the scores are normalized using an exponential normalizer (e.g. softmax 614), as follows:

$$p(j \mid h_t^{dep}) = \frac{\exp(m(t, j))}{\sum_{k=1, k \neq t}^{L+1} \exp(m(t, k))},$$

where L is the sentence length.

Next, the dependency labels are predicted using $[h_t^{dep}; h_j^{dep}]$ as input to another exponential normalizer (e.g., softmax 628 with a single ReLU layer). At test time, in one implementation, the parent node and the dependency label are greedily selected for each word in the sentence. That is, model 100 operates without a beam search in the POS label embedding layer, the chunk label embedding layer or the dependency parent identification and dependency relationship label embedding layer. This results because the model 100 calculates the label embeddings on a word-by-word basis, which increases parallelization and improves computational efficiency because it avoids the redundancies and computational latency typically caused by beam search. In addition, the word-by-word computation, during the dependency parsing, allows the model 100 to correct any incorrectly labeled roots such that if a word is predicted as the root of itself, the model 100 can detect that as an incorrect prediction and can automatically calculate a new correct prediction for the word.

In one implementation, model 100 assumes that each word in the sentence only has one parent node. In another implementation, model 100 assumes that each word can have multiple parent nodes and produces dependency labels using cyclic graphs-like computation. At training time, model 100 uses the gold or ground truth child-parent pairs to train the label predictor.

FIG. 6H shows two example sentences on which model 100 applies dependency parsing. In the example (a), the two boldfaced words "counsels" and "need" are predicted as child nodes of the root node, and the underlined word "counsels" is the correct one based on the gold annotations. In the example (b), none of the words are connected to the root node, and the correct child node of the root is the underlined word "chairman". Model 100 uses the single parameterized vector r to represent the root node for each sentence and captures various types of root nodes. In some implementations, model 100 uses sentence-dependent root representations.

FIG. 6I includes a table that shows the results of the dependency parsing layer of the model 100. Model 100 achieves the state-of-the-art results. Note that the greedy dependency parser of the model 100 outperforms the previous state-of-the-art result which based on beam search with global information. This shows that the bi-LSTMs of the model 100 efficiently capture global information necessary for dependency parsing.

Semantic Task—Semantic Relatedness

Figure 7A:
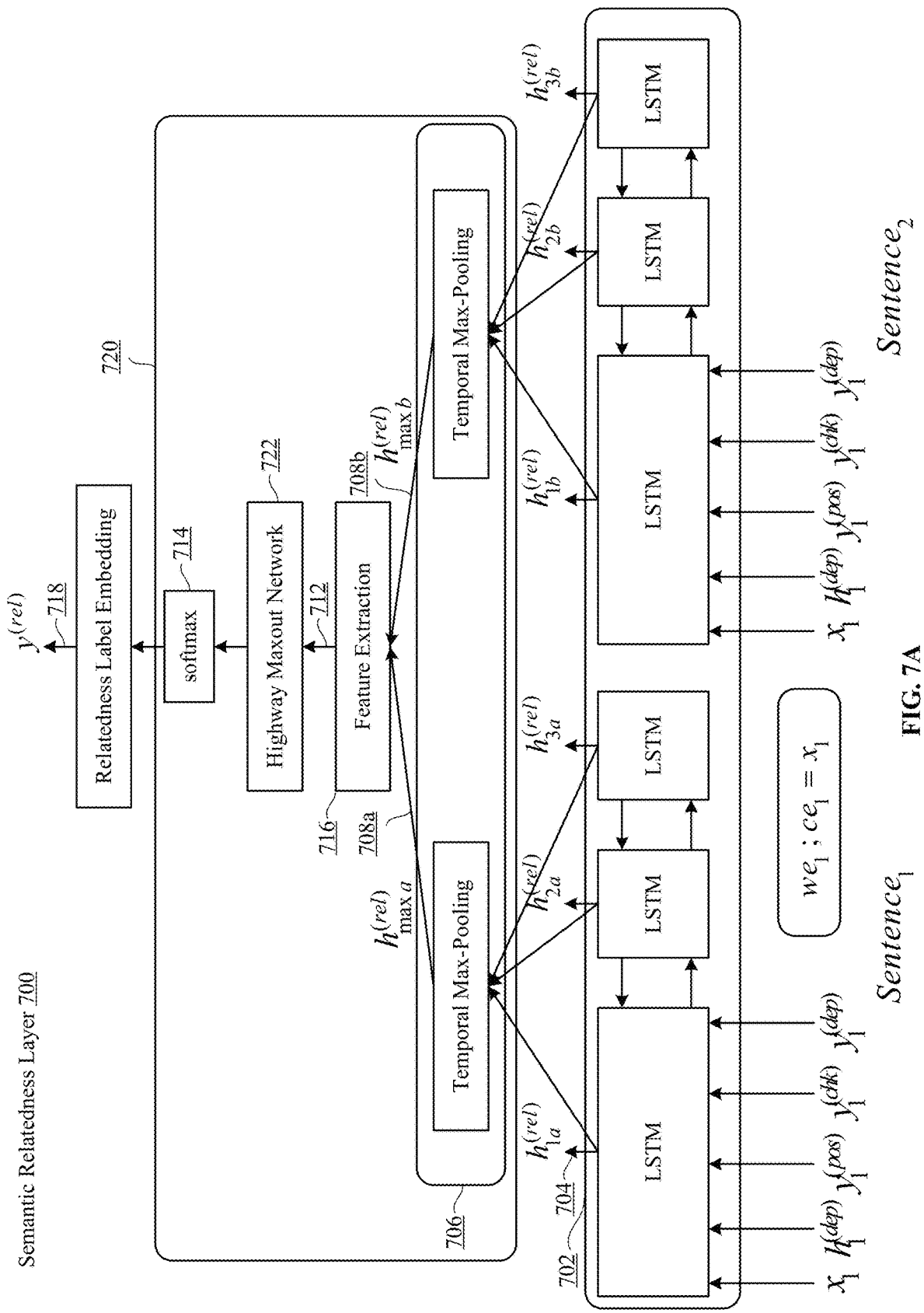
FIG. 7A shows one implementation of the semantic relatedness layer.

FIG. 7A shows one implementation of operation of a semantic relatedness layer 700 of the model 100.

The next two NLP tasks of the model 100 encode the semantic relationships between two input sentences. The first task measures the semantic relatedness between two sentences. The output of the semantic relatedness layer is a real-values relatedness score for the input sentence pair. The second task is a textual entailment task, which requires one to determine whether a premise sentence entails a hypothesis sentence. These are typically three classes: entailment, contradiction, and neutral.

The two semantic tasks are closely related to each other. In implementations, good semantic relatedness is represented by a low semantic relatedness score. Thus if the semantic relatedness score between two sentences is very low, i.e., the two sentences have high semantic relatedness, they are likely to entail each other. Based on this intuition and to make use of the information from lower layers, model 100 uses the fourth and fifth bi-LSTM layers for the relatedness and entailment task, respectively.

Since these tasks require sentence-level representation rather than the word-level representation used in the previous tasks, model 100 computes the sentence-level representation $h_s^{rel}$ as the element-wise maximum values across all the word-level representations in the fourth layer, as follows:

$$h_s^{rel} = \max(h_1^{rel}, h_2^{rel}, \ldots, h_L^{rel}),$$

where L is the length of the sentence.

To model the semantic relatedness between s and s', a feature vector is calculated as follows:

$$d_1(s,s') = [|h_s^{rel} - h_{s'}^{rel}|; h_s^{rel} \odot h_{s'}^{rel}], \tag{2}$$

where $|h_s^{rel} - h_{s'}^{rel}|$ is the absolute value of the element-wise subtraction, and $h_s^{rel} \odot h_{s'}^{rel}$ is the element-wise multiplication. Both these operations can be regarded as two different similarity metrics of the two vectors. Then, $d_1$ (s, s') is fed into an exponential normalizer (e.g., softmax) with a single Maxout hidden layer 722 to output a related score (e.g., between 1 and 5) for the sentence pair. The Maxout hidden layer 722 includes a plurality of linear functions with (e.g., pool size is four) that each generate a non-linear projection of the $d_1$ (s, s') such that a maximum non-linear projection is fed to the exponential normalizer.

Turning to FIG. 7A, the semantic relatedness layer 700 with a bi-directional LSTM 702, overlying the dependency parent identification and dependency relationship label embedding layer 600, also includes a relatedness vector calculator 720 and a relatedness classifier 714. The relatedness vector calculator 720 calculates a sentence-level representation 708a and 708b of each of the first and second sentences, including a bi-directional LSTM calculation of forward and backward state vectors 704 for each of the words in the respective sentences and an element-wise max pooling calculation 706 over the forward and backward state vectors 704 for the words in the respective sentences to produce sentence-level state vectors 708a and 708b representing the respective sentences. An alternative implementation could use average pooling. Then, the relatedness vector calculator 720 further calculates an element-wise sentence-level relatedness vector 712 that is processed by the relatedness classifier 714 to derive a categorical classification of relatedness between the first and second sentences. In some implementations, the relatedness vector calculator reports the categorical classification for further processing, such for generated relatedness label embeddings 718.

The relatedness vector calculator 720 includes a feature extraction module 716 that calculates element-wise differences between the sentence-level relatedness vectors 708a and 708b for the first and second sentences, calculates element-wise products between sentence-level relatedness vectors 708a and 708b for the first and second sentences, and uses vectors of absolute values of the element-wise differences and the element-wise products as inputs to the relatedness classifier 714.

FIG. 7B includes a table that shows the results of the semantic relatedness task. Model 100 achieves the state-of-the-art result.

Semantic Task—Textual Entailment

For entailment classification between two sentences, model 100 also uses the max-pooling technique as in the semantic related task. To classify the premise-hypothesis pair (s, s') into one of the three classes, model 100 computes the feature vector $d_2$ (s, s') as in equation (2), except that it does not use the absolute values of the element-wise subtraction so as to identify which is the premise (or hypothesis). Then, $d_2$ (s, s') is fed into an exponential normalizer (e.g., softmax) with multiple Maxout hidden layers (e.g., three Maxout hidden layers) 822.

A Maxout hidden layer applies multiple linear functions and non-linear activations to an input and selects the best result. When multiple Maxout hidden layers are arranged in a stack, the maximum output from a preceding Maxout hidden layer is provided as input to a successive Maxout hidden layer. The maximum output of the last Maxout hidden layer in the stack is provided to the exponential normalizer for classification. Note that temporal max pooling just evaluates, element-wise, individual dimensions of multiple input vectors and selects a maximum dimension value for each ordinal position to encode in a max pooled vector. In contrast, a Maxout hidden layer subjects an input vector to multiple non-linear transformations and selects just one linear transformation that has maximum dimension values.

To make direct use of the output from the relatedness layer, model 100 uses the label embeddings for the relatedness task. Model 100 computes the class label embeddings for the semantic related task similar to equation (1). The final feature vectors that are concatenated and fed into the entailment classifier are weighted relatedness embedding and the feature vector $d_2$ (s, s').

Figure 8A:
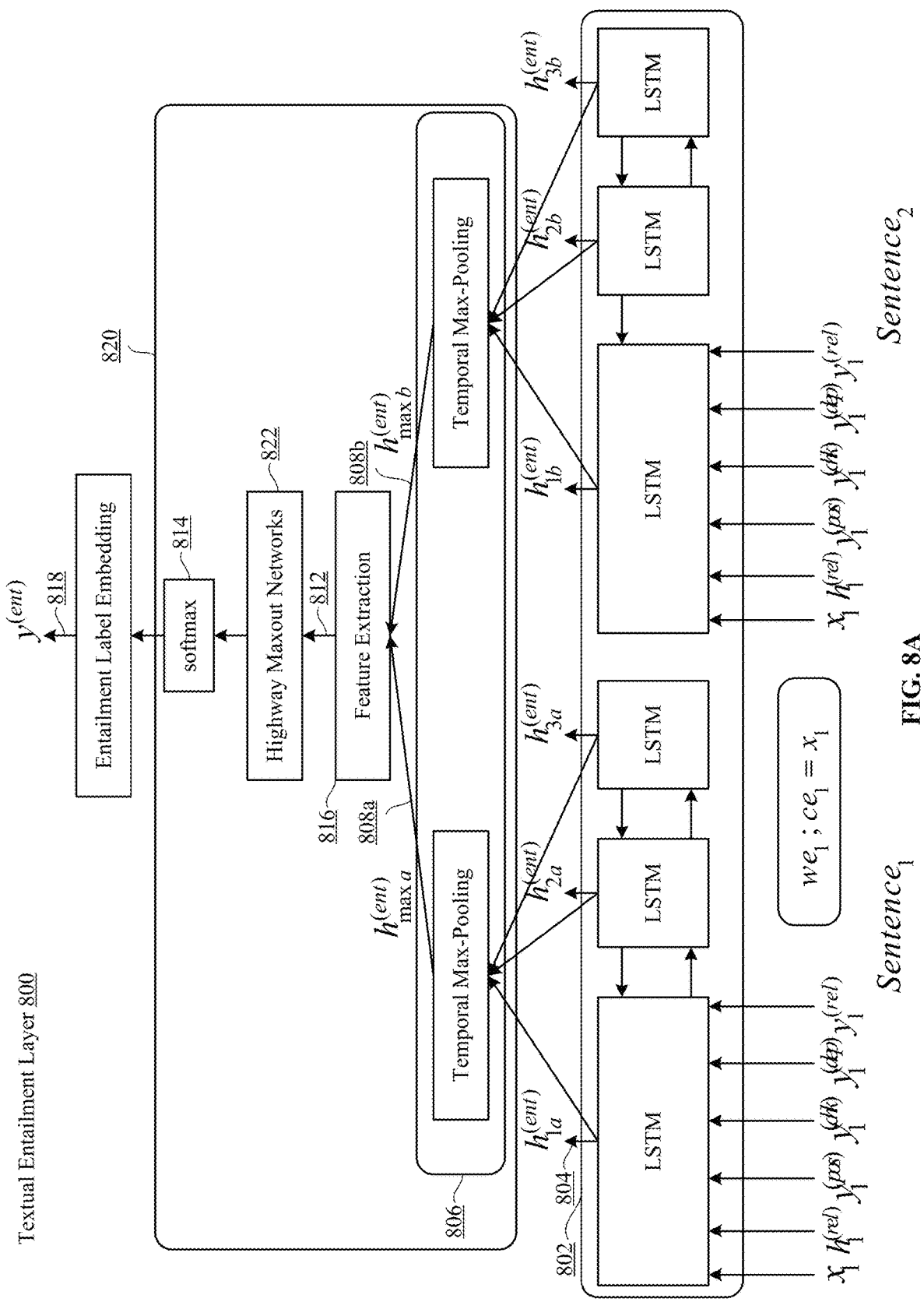
FIG. 8A shows one implementation of the entailment layer.

Turning to FIG. 8A, the entailment layer 800 with a bi-directional LSTM 802, overlying the semantic entailment layer 800, also includes a entailment vector calculator 820 and a entailment classifier 814. The entailment vector calculator 820 calculates a sentence-level representation 808*a* and 808*b* of each of the first and second sentences, including a bi-directional LSTM calculation of forward and backward state vectors 804 for each of the words in the respective sentences and an element-wise max pooling calculation 806 over the forward and backward state vectors 804 for the words in the respective sentences to produce sentence-level state vectors 808*a* and 808*b* representing the respective sentences. An alternative implementation could use average pooling. Then, the entailment vector calculator 820 further calculates an element-wise sentence-level entailment vector 812 that is processed by the entailment classifier 814 to derive a categorical classification of entailment between the first and second sentences. In some implementations, the entailment vector calculator reports the categorical classification for further processing, such for generated entailment label embeddings 818.

The entailment vector calculator 820 includes a feature extraction module 816 that calculates element-wise differences between the sentence-level entailment vectors 808*a* and 808*b* for the first and second sentences, calculates element-wise products between sentence-level entailment vectors 808*a* and 808*b* for the first and second sentences, and uses vectors of absolute values of the element-wise differences and the element-wise products as inputs to the entailment classifier 814.

FIG. 8B includes a table that shows the results of the textual entailment task. Model 100 achieves the state-of-the-art result.

Training—Successive Regularization

In NLP tasks, multi-task learning has the potential to improve not only higher-level tasks, but also lower-level tasks. Rather than treating as fixed the pre-trained model parameters, the disclosed successive regularization allows model 100 to continuously train the lower-level tasks without catastrophic forgetting.

Model 100 is trained jointly over all datasets. During each epoch, the optimization iterates over each full training dataset in the same order as the corresponding tasks described above.

Training the POS Layer

One training corpus for the POS layer 400 is the Wall Street Journal (WSJ) portion of Penn Treebank. This corpus includes tokens labelled with POS tags. During training of the POS layer 400, L2-norm regularization is applied to the layer parameters of the POS layer 400 because it is the current layer. Successive regularization is applied to layer parameters of just one underlying layer, namely, the embedding layer, which includes the word embedding space 204 and the character embedding space 208.

Let $\theta=(W_{pos}, b_{pos}, \theta_e)$ denote the set of model parameters associated with the POS layer 400, where $W_{pos}$ is the set of the weight matrices in the first bi-LSTM and the classifier, and $b_{pos}$ is the set of the bias vectors. The objective function to optimize $\theta_{pos}$ is defined as follows:

$$J_1(\theta_{pos}) = -\sum_s \sum_t \log p(y_t^{(pos)} = \alpha \mid h_t^{(pos)}) + \lambda \|W_{pos}\|^2 + \delta\|\theta_e - \theta'_e\|^2,$$

where $p(y_t^{(pos)}=\alpha|h_t^{(pos)})$ is the probability value that the correct label $\alpha$ is assigned to $w_t$ in the sentence S, $\lambda\|W_{pos}\|^2$ is the L2-norm regularization term, and $\lambda$ is a L2-norm regularization hyperparameter. $\delta\|\theta_e-\theta_e'\|^2$ is the successive regularization term. The successive regularization prevents catastrophic forgetting in the model 100 and thus prevents it from forgetting the information learned for the other tasks. In the case of POS tagging, the regularization is applied to $\theta_e$, and $\theta_e\theta$ is the embedding parameters after training the final task in the top-most layer at the previous training epoch. $\delta$ is a successive regularization hyperparameter, which can be different for different layers of the model 100 and can also be value-assigned variedly to network weights and biases.

Training the Chunking Layer

To train the chunking layer 500, the WSJ corpus was used in which the chunks are labelled. During training of the chunking layer 500, L2-norm regularization is applied to the layer parameters of the chunking layer 500 because it is the current layer. Successive regularization is applied to layer parameters of two underlying layers, namely, the embedding layer and the POS layer 400.

The objective function for the chunking layer is defined as follows:

$$J_2(\theta_{chk}) = -\sum_s \sum_t \log p(y_t^{(chk)} = \alpha \mid h_t^{(chk)})d + \lambda\|W_{chk}\|^2 + \delta\|\theta_{pos} - \theta'_{pos}\|^2,$$

which is similar to that of POS tagging, and $\theta_{chk}$ is ($W_{chk}$, $b_{chk}$, $E_{pos}$, $\theta_e$), where $W_{chk}$ and $b_{chk}$ are the weight and bias parameters including those in $\theta_{pos}$, and $E_{pos}$ is the set of the POS label embeddings. $\theta'_{pos}$ are the POS parameters after training the POS layer 400 at the current training epoch.

Training the Dependency Layer

To train the dependency parsing layer 600, the WSJ corpus with dependency labels was used. During training of the dependency parsing layer 600, L2-norm regularization is applied to the layer parameters of the dependency parsing layer 600 because it is the current layer. Successive regularization was applied to layer parameters of three underlying layers, namely, the embedding layer, the POS layer 400, and the chunking layer 500.

The objective function for the dependency layer is defined as follows:

$$J_3(\theta_{dep}) = -\sum_s \sum_t \log p(\alpha \mid h_t^{(dep)}) p(\beta \mid h_t^{(dep)}, h_\alpha^{(dep)}) + \lambda(\|W_{dep}\|^2 + \|W_d\|^2) + \delta\|\theta_{chk} - \theta'_{chk}\|^2,$$

where $p(\alpha|h_t^{dep})$ is the probability value assigned to the correct parent node label $\alpha$ is for $w_t$, and $p(\beta|h_t^{dep}, h_\alpha^{dep})$ is the probability value assigned to the correct dependency label $\beta$ for the child-parent pair $(w_t, \alpha)$. $\theta_{dep}$ is defined as $(W_{dep}, b_{dep}, W_d, r, E_{pos}, E_{chk}, \theta_e)$ where $W_{dep}$ and $b_{dep}$ are the weight and bias parameters including those in $\theta_{chk}$, and $E_{chk}$ is the set of the chunking label embeddings.

Training the Relatedness Layer

At the semantic relatedness layer 700, training used the SICK dataset. During training of the semantic relatedness layer 700, L2-norm regularization was applied to the layer parameters of the semantic relatedness layer 700 because it is the current layer. Successive regularization was applied to layer parameters of four underlying layers, namely, the embedding layer, the POS layer 400, the chunking layer 500, and the dependency parsing layer 600.

The objective function for the relatedness layer is defined as follows:

$$J_4(\theta_{rel}) = -\sum_{(s,s')} KL(\hat{p}(s,s') \| p(p(h_s^{rel}, h_{s'}^{rel}))) + \lambda\|W_{rel}\|^2 + \delta\|\theta_{dep} - \theta'_{dep}\|^2,$$

where $p(s, s')$ is the gold distribution over the defined relatedness score, $p$ $(p(h_s^{rel}, h_{s'}^{rel})$ is the predicted distribution given the sentence representations, and KL $(\hat{p}(s,s')\|p(p(h_s^{rel},h_{s'}^{rel}))$ os the KL-divergence between the two distributions. $\theta_{rel}$ is defined as $(W_{rel}, b_{rel}, E_{pos}, E_{chk}, \theta_e)$.

Training the Entailment Layer

To train the entailment layer 800, we also used the SICK dataset. During training of the entailment layer 800, L2-norm regularization is applied to the layer parameters of the entailment layer 800 because it is the current layer. Successive regularization is applied to layer parameters of five underlying layers, namely, the embedding layer, the POS layer 400, the chunking layer 500, the dependency parsing layer 600, and the semantic relatedness layer 700.

The objective function for the entailment layer is defined as follows:

$$J_5(\theta_{ent}) = -\sum_{(s,s')} \log p(y_{(s,s')}^{ent}) = \alpha|h_s^{etl}, h_{s'}^{etl}|) + \lambda\|W_{ent}\|^2 + \delta\|\theta_{rel} - \theta'_{rel}\|^2,$$

where $p(y_{(s,s')}^{ent}=\alpha|h_s^{etl},h_{s'}^{etl}|$ is the probability value that the correct label $\alpha$ is assigned to the premise-hypothesis pair $(s, S')$. $\theta_{ent}$ is defined as $(W_{ent}, b_{ent}, E_{pos}, E_{chk}, E_{rel}, \theta_e)$, where $E_{rel}$ is the set of the relatedness label embeddings.

Epochs of Training

Figure 9A:
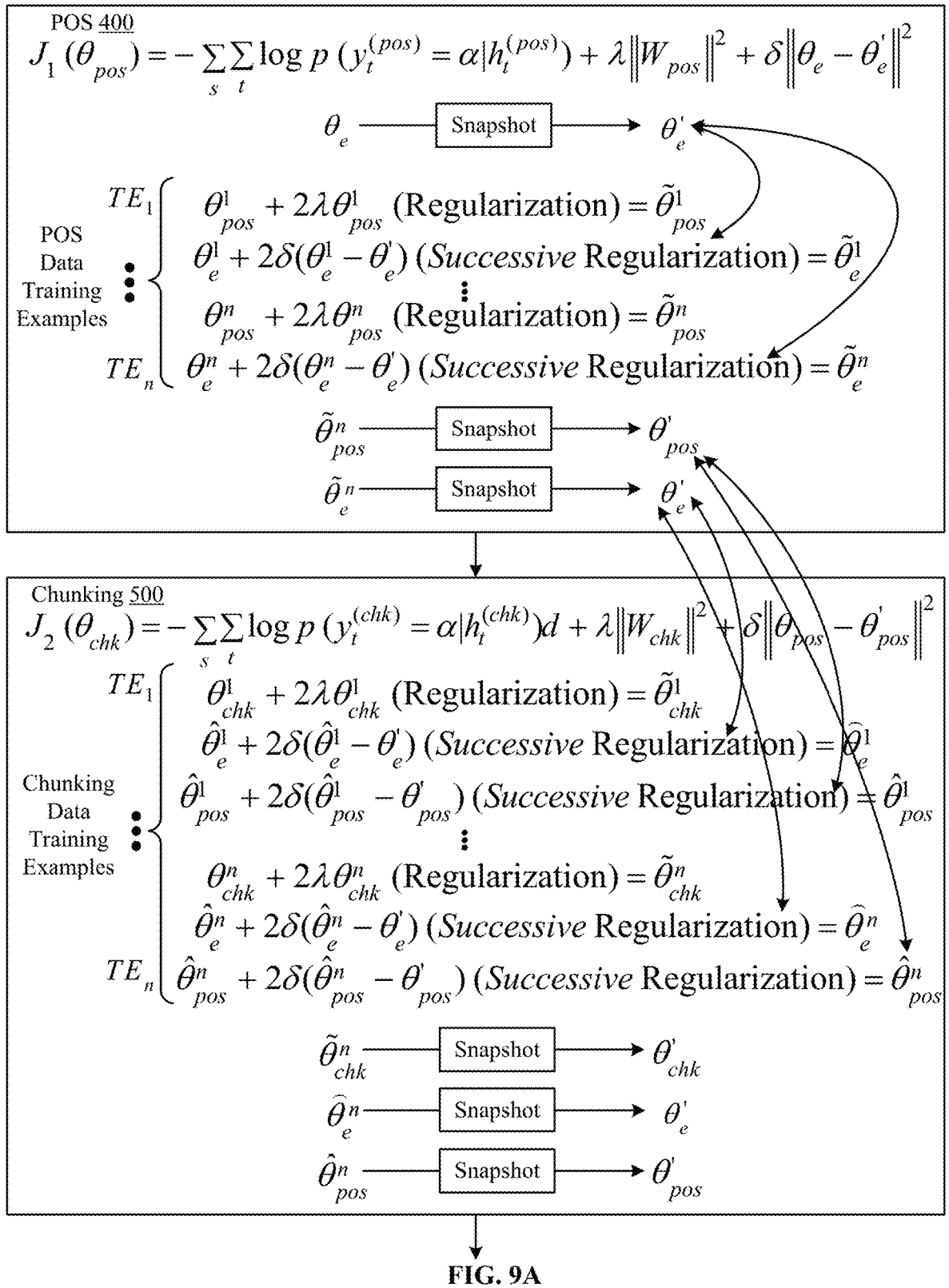
FIG. 9A shows one implementation of training a stacked LSTM sequence processor that is stacked with at least three layers according to an analytical hierarchy.

Turning to FIG. 9A, FIG. 9A shows one implementation of training a stacked LSTM sequence processor that is stacked with at least three layers according to an analytical hierarchy. In FIG. 9A, first, second and third layers (e.g., POS layer 400, chunking layer 500, and dependency layer 600) are trained by backward propagation using training examples directed to each layer, with regularized pass down to underlying layers during training. The training includes training the first layer using first layer training examples (e.g., POS data), training the second layer using second layer training examples (e.g., chunking data) with regularized pass down training to the first layer, and training the third layer using third layer training examples (e.g., dependency data) with regularized pass down training to the first and second layers. The regularized pass down training is regularized by constraining a training objective function, having a fitness function with at least two regularization terms. The two regularization terms regularize by penalizing growth in a magnitude of weights in coefficient matrices applied to the underlying layers and that successively regularize all changes in the weights in the coefficient matrices applied to the underlying layers. In one implementation, the fitness function is cross-entropy loss. In another implementation, the fitness function is KL-divergence. In yet another implementation, the fitness function is mean squared error.

In the example shown in FIG. 9A, two sub-epochs of a single epoch are depicted. In one implementation, model 100 has five sub-epochs corresponding to five NLP tasks. In each sub-epoch, a batch of training examples $TE_1 \ldots TE_n$ corresponding to the current layer's training data is processed. Every time a training example is processed by a current layer, the layer parameters $\theta s_{underlying\ layers}$ of the underlying layers and the layer parameters $\theta_{current\ layer}$ of the current layer are updated by back-propagating the gradients. $\tilde{\theta}_{n_{underlying\ layer}}$ denotes the updated value of a parameter $\theta_{n_{underlying\ layer}}$ of an underlying layer as a result of back-propagation on a given training example of the current layer. Also, at the end of each sub-epoch, a "snapshot" is taken of the current state of the embedding parameters of the current layer and of the current state of the embedding parameters of all the underlying layers. The snapshotted values are persisted in memory as $\theta_{underlying\ layers}'$ and are referred to herein as "current anchor values".

At the end of each sub-epoch, the successive regularization term $\delta\|\theta-\theta'\|^2$ ensures that the update value $\tilde{\theta}_{n_{underlying\ layer}}$ does not significantly deviate from the current anchor values $\theta_{underlying\ layers}'$ of the layer parameters.

In FIG. 9A, the first sub-epoch at the POS layer 400 starts with current anchored values of the embedding layer and successive regularizes only the embedding layer parameters $\theta_e$. Note that successive regularization is not applied to the parameters of the current layer, i.e., layer parameters $\theta_{pos}$ the POS layer 400, and only L2-norm regularization $\lambda\|W_{pos}\|^2$ is applied to the current layer's updated parameters to produce regularized current layer parameters $\hat{\theta}_{pos}$. Successive regularization ensures that the layer parameter values of the underlying layers updated during the training of the POS layer 400, i.e. $\theta_e$, do not significantly deviate from the currently anchored values $\theta_e'$. This produces successively regularized underlying layer parameters $\hat{\theta}_e$. At the end of the sub-epoch, the most recently regularized current layer parameters $\hat{\theta}_{pos}''$ and the most recently successively regularized underlying layer parameters $\hat{\theta}_e''$ are subjected to the snapshot operation and persisted in memory as the new current anchored values.

In the next layer, such as chunking layer 500, the underlying layer parameters now include parameters for the embedding layer and the POS layer. These underlying layer parameters are subjected to successive regularization, while the current layer parameters of the chunking layer are only subjected to L2-norm regularization. This process continues for all the layers of the model 100.

FIG. 9B includes a table that demonstrates the effectiveness of the successive regularization technique. In FIG. 9B, the column of "w/o SR" shows the results of not using successive regularization in the model 100. It can be seen that the accuracy of chunking is improved by the successive regularization, while other results are not affected so much. The chunking dataset used here is relatively small compared with other low-level tasks, POS tagging and dependency parsing. Thus, these results suggest that the successive regularization is effective when dataset sizes are imbalanced.

FIG. 10 includes a table that shows results of the test sets on the five different NLP tasks. In FIG. 10, the column "Single" shows the results of handling each task separately using single-layer bi-LSTMs, and the column "JMTall" shows the results of the model 100. The single task settings only use the annotations of their own tasks. For example, when treating dependency parsing as a single task, the POS and chunking tags are not used. It can be seen that all results of the five different tasks are improved in the model 100, which shows that model 100 handles the five different tasks in a single model. Model 100 also allows accessing of arbitrary information learned from the different tasks. For example, in some implementations, to use the model 100 just as a POS tagger, the output from the first bi-LSTM layer can be used. The output can be the weighted POS label embeddings as well as the discrete POS tags.

The table in FIG. 10 also shows the results of three subsets of the different tasks. For example, in the case of "JMTABC", only the first three layers of the bi-LSTMs are used to handle the three tasks. In the case of "JMTDE", only the top two layers are used just as a two-layer bi-LSTM by omitting all information from the first three layers. The results of the closely-related tasks show that model 100 improves not only the high-level tasks, but also the low-level tasks.

Other implementations of the technology disclosed include using normalizers different than, in addition to, and/or in combination with the exponential normalizer. Some examples include sigmoid based normalizers (e.g., multiclass sigmoid, piecewise ramp), hyperbolic tangent based normalizers, rectified linear unit (ReLU) based normalizers, identify based normalizers, logistic based normalizers, sine based normalizers, cosine based normalizers, unit sum based normalizers, and step based normalizers. Other examples include hierarchical softmax, differentiated softmax, importance sampling, noise contrastive estimation, negative sampling, gated softmax spherical softmax, Taylor softmax, and sparsemax. In yet other implementations, any other conventional or future-developed normalizer can be used.

While this technology is discussed with respect to bidirectional LSTMs, there are other emerging forms of LSTMs that may evolve as substitutes of LSTMs. In other implementation, the technology disclosed uses unidirectional LSTMs in one or more or all layers of the model 100. Examples of some variants of the LSTM include no input gate (NIG) variant, no forget gate (NFG) variant, no output gate (NOG) variant, no input activation function (NIAF) variant, no output activation function (NOAF) variant, coupled input-forget gate (CIFG) variant, peephole (PH) variant, and full gate recurrent (FGR) variant. Yet other implementations include using a gated recurrent unit (GRU), or any other type of RNN, or any other conventional or future-developed neural network.

In yet other implementations, the layers of the model 100 are stacked in the form of a directed acyclic graph. In such implementations, some layers may not be successively on top of others and may instead be acyclically arranged.

Particular Implementations

In one implementation, a multi-layer neural network system, running on hardware that processes words in an input sentence, is described that includes a stacked long-short-term-memory (abbreviated LSTM) sentence processor, running on hardware, stacked in layers according to a linguistic hierarchy. The stacked LSTM includes bypass connections that deliver input to underlying layers together with embedding outputs of the underlying layers to overlaying layers. The stacked layers include (i) a part-of-speech (abbreviated POS) label embedding layer, (ii) a chunk label embedding layer overlying the POS label embedding layer, and (iii) a dependency parent identification and dependency relationship label embedding layer overlying the chunk label embedding layer. The POS label embedding layer, implemented as a bi-directional LSTM and a POS label classifier, processes word embedding vectors representing the words in the input sentence, and produces POS label embedding vectors and POS state vectors for each of the words. The chunk label embedding layer, implemented as a bi-directional LSTM and a chuck label classifier, processes at least the word embedding vectors, the POS label embedding vectors and the POS state vectors, to produce chunk label embeddings and chunk state vectors. The dependency parent identification and dependency relationship label embedding layer, implemented as a bi-directional LSTM and one or more classifiers, processes the word embeddings, the POS label embeddings, the chunk label embeddings and the chunk state vectors, to identify dependency parents of each of the words in the sentence to produce dependency relationship labels or label embeddings of relationships between the words and respective potential parents of the words. The multi-layer neural network system also includes an output processor that outputs at least results reflecting the identification of dependency parents and production of dependency relationship label embeddings for the words in the sentence.

This system and other implementations of the technology disclosed can each optionally include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

In an implementation of the disclosed multi-layer neural network system, the linguistic hierarchy builds from the words in the sentence, to the parts of speech, to the chunks of the sentence, to dependency links between the words and their dependency parents, to labels on the dependency links.

A bypass connection supplies an input vector used by an underlying layer to an overlying layer without modification.

In some implementations, the POS label embedding layer further processes n-character-gram embedding vectors that represent the words in the input sentence, in addition to the word embedding vectors. Additionally, the bypass connections deliver the n-character-gram embedding vectors to the chunk label embedding layer and the dependency parent and dependency relationship label embedding layer as input to respective bi-directional LSTMs in those overlaying layers.

The POS label embedding layer can further produce POS label probability mass vectors, by exponential normalization of the POS state vectors, and produces the POS label embedding vectors, from the POS label probability mass vectors. Additionally, the chunk label embedding layer produces chunk label probability mass vectors, by exponential normalization of the chunk label state vectors, and produces the chunk label embedding vectors from the chunk label probability mass vectors. Furthermore, the dependency parent identification and dependency relationship label embedding layer produces parent label probability mass vectors by classification and exponential normalization of parent label state vectors produced by the bi-directional LSTM. The dependency parent identification and dependency relationship label embedding layer also produces the parent label embedding vectors from the parent label probability mass vectors, produces dependency relationship label probability mass vectors by classification and exponential normalization of the parent label state vectors and the parent label embedding vectors, and produces the dependency relationship label embedding vectors from the dependency relationship label probability mass vectors. The dimensionalities of the POS label embedding vectors, the chunk label embedding vectors, and the dependency relationship label embedding vectors are similar, within +/− ten percent The technology disclosed can further include a word embedding processor, underlying the POS label embedding layer. The word embedding processor includes a word embedder and an n-character-gram embedder. The word embedder maps the words in the sentence, when recognized, into a word embedding space represented by a word embedding vector. Additionally, the n-character-gram embedder (i) processes character substrings of the word at multiple scales of substring length, (ii) maps each processed character substring into an intermediate vector representing a position in a character embedding space, and (iii) combines the intermediate vectors for each unique processed character substring to produce character embedding vectors for each of the words. The sentence embedding processor also combines results of the word embedder and the n-character-gram embedder, whereby a word not previously mapped into the word embedding space is nonetheless represented by the character embedding vector.

The n-character-gram embedder can combine the intermediate vectors in at least two ways. It can produce element wise averages in the character embedding vector or it can select element wise maximums. The POS label classifier can include a softmax layer or, more generally, an exponential normalizer. These alternatives also apply to the chunk label classifier.

The disclosed technology operates well without a beam search in the POS label embedding layer, the chunk label embedding layer or the dependency parent identification and dependency relationship label embedding layer. It could be implemented with a beam search having a narrow span.

The dependency parent identification and dependency relationship label embedding layer further includes a dependency parent layer and a dependency relationship label classifier. The dependency parent identifier layer includes a dependency parent analyzer, implemented as a bi-directional LSTM, that processes the words in the input sentences. Specifically, the dependency parent analyzer processes, for each word, word embeddings, the POS label embeddings, the chunk label embeddings, and the chunk state vector to accumulate forward and backward state vectors that represent forward and backward progressions of interactions among the words in the sentence. The dependency parent identifier layer also includes an attention encoder that processes the forward and backward state vectors for each respective word in the sentence, and encodes attention as inner products between each respective word and other words in the sentence, with a linear transform applied to the forward and backward state vectors for the word or the other words prior to the inner product. Additionally, the attention encoder applies exponential normalization to vectors of the inner products to produce parent label probability mass vectors and projects the parent label probability mass vectors to produce parent label embedding vectors. Further, the technology disclosed includes a dependency relationship label classifier that, for each respective word in the sentence, (i) classifies and normalizes the forward and backward state vectors and the parent label embedding vectors and the parent label embedding vectors, to produce dependency relationship label probability mass vectors, and (ii) projects the dependency relationship label probability mass vectors to produce dependency relationship label embedding vectors.

In an implementation, the disclosed multi-layer neural network system further includes a semantic relatedness layer, overlying the dependency parent identification and dependency relationship label embedding layer. The semantic relatedness layer includes a relatedness vector calculator and a relatedness classifier and operates on pairs of first and second sentences processed through the multi-layer neural network system. The relatedness vector calculator, of the technology disclosed, calculates a sentence-level representation of each of the first and second sentences. The calculations performed by the relatedness vector calculator include (i) a bi-directional LSTM calculation of forward and backward state vectors for each of the words in the respective sentences, and (ii) an element-wise max pooling calculation over the forward and backward state vectors for the words in the respective sentences to produce sentence-level state vectors representing the respective sentences. The relatedness vector calculator further calculates an element-wise sentence-level relatedness vector that is processed by the relatedness classifier to derive a categorical classification of relatedness between the first and second sentences [and reports the categorical classification for further processing].

The relatedness vector calculator can also (i) calculate element-wise differences between the sentence-level relatedness vectors for the first and second sentences, (ii) calculate element-wise products between the sentence-level relatedness vectors for the first and second sentences, and (iii) use vectors of absolute values of the element-wise differences and the element-wise products as inputs to the relatedness classifier.

The technology disclosed can further include an entailment layer that overlays the semantic relatedness layer. The entailment layer includes an entailment vector calculator and an entailment classifier. Further, the entailment vector calculator calculates a sentence-level representation of each of the first and second sentences. The calculations performed by the entailment vector calculator can include (i) a bi-directional LSTM calculation of forward and backward state vectors for each of the words in the respective sentences, and (ii) an element-wise max pooling calculation over the forward and backward state vectors for the words in the respective sentences to produce sentence-level state vectors representing the respective sentences. The entailment vector calculator can further calculate an element-wise sentence-level entailment vector that is processed by the entailment classifier to derive a categorical classification of entailment between the first and second sentences [and reports the categorical classification for further processing].

The entailment vector calculator can further (i) calculate element-wise differences between the sentence-level relatedness vectors for the first and second sentences, (ii) calculate element-wise products between the sentence-level relatedness vectors for the first and second sentences, and (iii) use vectors of the element-wise differences and the element-wise products as inputs to the relatedness classifier.

In another implementation, a method is provided that processes words in an input sentence using a stacked layer long-short-term-memory (abbreviated LSTM) sentence processor, running on hardware, stacked in layers according to a linguistic hierarchy. These stacked layers include (i) a part-of-speech (abbreviated POS) label embedding layer, (ii) a chunk label embedding layer overlying the POS label embedding layer, and (iii) a dependency parent identification and dependency relationship label embedding layer overlying the chunk label embedding layer. In particular, this method, of the technology disclosed includes delivering, via bypass connections, input used by underlying layers together with embedding outputs from the underlying layers to overlaying layers. The method also includes, in the POS label embedding layer, applying a bi-directional LSTM and a POS label classifier to process word embedding vectors representing the words in the input sentence, and producing POS label embedding vectors and POS state vectors for each of the words. Additionally, the method includes, in the chunk label embedding layer, applying a bi-directional LSTM and a chuck label classifier to process at least the word embedding vectors, the POS label embedding vectors and the POS state vectors, and producing chunk label embeddings and chunk state vectors. According to the method, in the dependency parent identification and dependency relationship label embedding layer, a bi-directional LSTM and one or more classifiers are applied to process the word embeddings, the POS label embeddings, the chunk label embeddings and the chunk state vectors. This is done to identify dependency parents of each of the words in the sentence and producing dependency relationship labels or label embeddings of relationships between the words and respective potential parents of the words. The method also includes outputting results reflecting the dependency relationship labels or label embeddings for the words in the sentence.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In an implementation of the disclosed method, the linguistic hierarchy builds from the words in the sentence, to the parts of speech, to the chunks of the sentence, to dependency links between the words and their dependency parents, to labels on the dependency links.

The delivering, via the bypass connections, can supply an input vector used by an underlying layer to an overlying layer without modification.

In some implementations, the method, in the POS label embedding layer, processes n-character-gram embedding vectors that represent the words in the input sentence, in addition to the word embedding vectors. Additionally, the bypass connections deliver the n-character-gram embedding vectors to the chunk label embedding layer and the dependency parent and dependency relationship label embedding layer as input to respective bi-directional LSTMs in those overlaying layers.

The disclosed method can further include producing, in the POS label embedding layer, POS label probability mass vectors, by exponential normalization of the POS state vectors, and producing the POS label embedding vectors, from the POS label probability mass vectors. Additionally, in the chunk label embedding layer, the method produces chunk label probability mass vectors, by exponential normalization of the chunk label state vectors, and produces the chunk label embedding vectors from the chunk label probability mass vectors. Further, in the dependency parent identification and dependency relationship label embedding layer, the disclosed technology (i) produces parent label probability mass vectors by classification and exponential normalization of parent label state vectors produced by the bi-directional LSTM, (ii) produces the parent label embedding vectors from the parent label probability mass vectors, (iii) produces dependency relationship label probability mass vectors by classification and exponential normalization of the parent label state vectors and the parent label embedding vectors, and (iv) produces the dependency relationship label embedding vectors from the dependency relationship label probability mass vectors. The dimensionalities of the POS label embedding vectors, the chunk label embedding vectors, and the dependency relationship label embedding vectors are similar, within +/− ten percent.

In some implementations, the stacked layers can include a sentence embedding layer, underlying the POS label embedding layer. The sentence embedding layer can include a word embedder and an n-character-gram embedder. Additionally, the method includes, mapping, in the word embedder, the words in the sentence, when recognized, into a word embedding space represented by a word embedding vector. The method also includes, in the n-character-gram embedder, (i) processing character substrings of the word at multiple scales of substring length, (ii) mapping each processed character substring into an intermediate vector representing a position in a character embedding space, and (iii) combining the intermediate vectors for each unique processed character substring to produce character embedding vectors for each of the words. The sentence embedding layer can output vectors from the word embedder and the n-character-gram embedder, whereby a word not previously mapped into the word embedding space is nonetheless represented by the character embedding vector.

The n-character-gram embedder can combine the intermediate vectors in at least two ways. It can produce element wise averages in the character embedding vector or it can select element wise maximums. The POS label classifier can include a softmax layer or, more generally, an exponential normalizer. These alternatives also apply to the chunk label classifier.

The disclosed technology operates well without a beam search in the POS label embedding layer, the chunk label embedding layer or the dependency parent identification and dependency relationship label embedding layer.

The dependency parent identification and dependency relationship label embedding layer further includes a dependency parent analyzer, an attention encoder, and a dependency relationship label classifier. The disclosed method applies, in the dependency parent analyzer, a bi-directional LSTM to process the words in the input sentences. This processing of the words can include processing, for each word, word and n-character-gram embeddings, the POS label embeddings, the chunk label embeddings, and the chunk state vector to accumulate forward and backward state vectors that represent forward and backward progressions of interactions among the words in the sentence. The method can also include processing, in the attention encoder, the forward and backward state vectors for each respective word in the sentence to encode attention as inner products between each respective word and other words in the sentence, after applying a linear transform to the forward and backward state vectors for the word or the other words, whereby weights in the linear transform are trainable. This method also includes applying, in the attention coder, exponential normalization to vectors of the inner products to produce parent label probability mass vectors and projecting the parent label probability mass vectors to produce parent label embedding vectors. In the dependency relationship label classifier and for each respective word in the sentence, the method (i) classifies and normalizes the forward and backward state vectors and the parent label embedding vectors and the parent label embedding vectors, to produce dependency relationship label probability mass vectors, and (ii) projects the dependency relationship label probability mass vectors to produce dependency relationship label embedding vectors.

In an implementation, the stacked layers further include a semantic relatedness layer, overlying the dependency parent identification and dependency relationship label embedding layer. The semantic relatedness layer includes a relatedness vector calculator and a relatedness classifier. The disclosed method further includes, in the semantic relatedness layer, operating on pairs of first and second sentences already processed through the disclosed method. Further, in the relatedness vector calculator, the disclosed method calculates a sentence-level representation of each of the first and second sentences by (i) applying a bi-directional LSTM to calculate forward and backward state vectors for each of the words in the respective sentences, and (ii) calculating an element-wise maximum of the forward and backward state vectors for each of the respective sentences to calculate an element-wise sentence-level relatedness vector. The method also includes processing the sentence-level relatedness vector to derive a categorical classification of relatedness between the first and second sentences [and reporting the categorical classification or the sentence-level relatedness vector for further processing].

The disclosed technology, in the relatedness vector calculator, (i) calculates element-wise differences between the first and second sentence-level relatedness vectors, (ii) calculates element-wise products between the first and second sentence-level relatedness vectors, and (iii) uses vectors of absolute values of the element-wise differences and of the element-wise products as inputs to the relatedness classifier.

In some implementations, the stacked layers further include an entailment layer, overlying the semantic relatedness layer. The entailment layer includes an entailment vector calculator and an entailment classifier. The entailment vector calculator calculates a sentence-level representation of each of the first and second sentences by (i) applying a bi-directional LSTM to calculate forward and backward state vectors for each of the words in the respective sentences, and (ii) calculating an element-wise maximum of the forward and backward state vectors for each of the respective sentences. The described method further includes (i) calculating, in the entailment vector calculator, an element-wise sentence-level entailment vector and (ii) processing the sentence-level entailment vector to derive a categorical classification of entailment between the first and second sentences.

The disclosed method can also include the entailment vector calculator (i) calculating element-wise differences between the sentence-level relatedness vectors for the first and second sentences, (ii) calculating element-wise products between the sentence-level relatedness vectors for the first and second sentences, and (iii) using vectors of the element-wise differences and the element-wise products as inputs to the relatedness classifier.

In another implementation, a multi-layer neural network system, running on hardware that processes a sequence of tokens in an input sequence, is described that includes a stacked LSTM token sequence processor, running on hardware, stacked in layers according to an analytical hierarchy. The stacked LSTM includes bypass connections that deliver input to underlying layers together with embedding outputs of the underlying layers to overlaying layers. The stacked layers include (i) a first embedding layer, (ii) a second embedding layer overlying the first embedding layer, and (iii) a third embedding layer overlying the second embedding layer. The first embedding layer, implemented as a bi-directional LSTM and a first label classifier, processes token embeddings representing the tokens in the input sequence, and produces first embeddings and first state vectors of the tokens. The second embedding layer, implemented as a bi-directional LSTM and a second label classifier, processes at least the token embeddings, the first label embeddings and first state vectors, to produce second label embeddings and second state vectors. The third embedding layer, implemented as a bi-directional LSTM, processes at least the token embeddings, the first label embeddings, the second label embeddings and the second state vectors to produce third label embeddings and third state vectors. The multi-layer neural network system also includes an output processor that outputs at least results reflecting the third label embeddings for the tokens in the input sequence.

This system and other implementations of the technology disclosed can each optionally include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

A bypass connection supplies an input vector used by an underlying layer to an overlying layer without modification.

In an implementation of the disclosed multi-layer neural network system, the first embedding layer further processes token decomposition embedding vectors that represent the tokens in the input sequence, in addition to the token embedding vectors. Additionally, the bypass connections deliver the token decomposition embedding vectors to the second embedding layer and the embedding third layer as input to respective bi-directional LSTMs in those overlaying layers.

In some implementations, the first embedding layer further produces first label probability mass vectors, by exponential normalization of the first state vectors, and produces the first label embedding vectors, from the first label probability mass vectors. Additionally, the second embedding layer produces second label probability mass vectors, by exponential normalization of the second state vectors, and produces the second label embedding vectors from the second label probability mass vectors. Further, the third embedding layer produces third label probability mass vectors, by exponential normalization of the third state vectors, and produces the third label embedding vectors from the third label probability mass vectors. Moreover, dimensionalities of the first label embedding vectors, the second label embedding vectors, and the third label embedding vectors are similar, within +/- ten percent.

The technology disclosed can further include a token embedding processor, underlying the first label embedding layer. The token embedding processor includes a token embedder and a decomposed token embedder. The token embedder maps the tokens in the sequence, when recognized, into a token embedding space represented by a token embedding vector. Further, the decomposed token embedder (i) processes token decompositions of the token at multiple scales, (ii) maps each processed token decomposition into an intermediate vector representing a position in a token decomposition embedding space, and (iii) combines the intermediate vectors for each unique processed token decomposition to produce token decomposition embedding vectors for each of the tokens. The token embedding processor also combines results of the token embedder and the decomposed token embedder, whereby a token not previously mapped into the token embedding space is nonetheless represented by the token decomposition embedding vector.

At least one of the label classifiers can include a softmax layer or, more generally, an exponential normalizer.

The disclosed technology also operates well without a beam search in the first through third label embedding layers.

In an implementation, the disclosed multi-layer neural network system further includes a fourth label embedding layer, overlying the third label embedding layer. The fourth label embedding layer can be implemented as a bi-directional LSTM to process at least the token embeddings, the first label embeddings, the second label embeddings, the third label embeddings and the third state vectors to produce fourth label embeddings and fourth state vectors.

The disclosed technology also includes a fifth label embedding layer, overlying the fourth label embedding layer. The fifth label embedding layer can be implemented as a bi-directional LSTM to process at least the token embeddings, the first label embeddings, the second label embeddings, the third label embeddings, fourth label embeddings and the fourth state vectors to produce fifth label embeddings and fifth state vectors.

In another implementation, a method is provided that processes tokens in an input sequence using a stacked layer long-short-term-memory (abbreviated LSTM) sentence processor, running on hardware, stacked in layers according to an analytical hierarchy. These stacked layers include (i) a first embedding layer, (ii) a second embedding layer overlying the first embedding layer, and (iii) a third embedding layer overlying the second embedding layer. In particular, this method includes delivering, via bypass connections, input used by underlying layers together with embedding outputs of the underlying layers to overlaying layers. The method also includes the first embedding layer applying a bi-directional LSTM and a first label classifier to process token embeddings representing the tokens in the input sequence, and producing first label embeddings and first state vectors of the tokens. Additionally, the method includes the second embedding layer, applying a bi-directional LSTM and a second label classifier to process at least the token embeddings, the first label embeddings and first state vectors, to produce second label embeddings and second state vectors. According to the method the third embedding layer, applies a bi-directional LSTM, to process at least the token embeddings, the first label embeddings, the second label embeddings and the second state vectors to produce third label embeddings and third state vectors. Further, according to the technology discloses the method includes outputting results reflecting stacked LSTM analysis according to the analytical hierarchy, including the third label embeddings for the tokens in the input sequence.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The delivering, via the bypass connections, can supply an input vector used by an underlying layer to an overlying layer without modification.

In some implementations, the method, in the first embedding layer, processes token decomposition embedding vectors that represent the tokens in the input sequence, in addition to the token embedding vectors. Additionally, the bypass connections further deliver the token decomposition embedding vectors to the second embedding layer and the embedding third layer as input to respective bi-directional LSTMs in those overlaying layers.

The disclosed method can further include the first embedding layer producing first label probability mass vectors, by exponential normalization of the first state vectors, and producing the first label embedding vectors, from the first label probability mass vectors. Additionally, the second embedding layer produces second label probability mass vectors, by exponential normalization of the second state vectors, and produces the second label embedding vectors from the second label probability mass vectors. The third embedding layer further produces third label probability mass vectors, by exponential normalization of the third state vectors, and produces the third label embedding vectors from the third label probability mass vectors. According to the discloses method, dimensionalities of the first label embedding vectors, the second label embedding vectors, and the third label embedding vectors are similar, within +/- ten percent.

The method disclosed can also include further invoking a token embedding processor, underlying the first label embedding layer that includes a token embedder and a decomposed token embedder. Further, the method can include, in the token embedder, mapping the tokens in the sequence, when recognized, into a token embedding space represented by a token embedding vector. Additionally, in the decomposed token embedder, the method (i) processes token decompositions of the token at multiple scales, (ii) maps each processed token decomposition into an intermediate vector representing a position in a token decomposition embedding space, and (iii) combines the intermediate vectors for each unique processed token decomposition to produce token decomposition embedding vectors for each of the tokens. The method also combines results of the token embedder and the decomposed token embedder, whereby a token not previously mapped into the token embedding space is nonetheless represented by the token decomposition embedding vector.

At least one of the label classifiers can include a softmax layer or, more generally, an exponential normalizer.

The disclosed technology also operates well without a beam search in the first through third label embedding layers.

According to the technology disclosed, the stacked layers include a fourth label embedding layer, overlying the third label embedding layer. The method also includes in the fourth label embedding layer, applying a bi-directional LSTM to process at least the token embeddings, the first label embeddings, the second label embeddings, the third label embeddings and the third state vectors to produce fourth label embeddings and fourth state vectors.

In another implementation, the stacked layers include a fifth label embedding layer, overlying the fifth label embedding layer. Further, the method includes, in the fifth label embedding layer, applying a bi-directional LSTM to process at least the token embeddings, the first label embeddings, the second label embeddings, the third label embeddings, fourth label embeddings and the fourth state vectors to produce fifth label embeddings and fifth state vectors.

In another implementation, a method is provided that trains a stacked LSTM sequence processor, running on hardware, stacked in at least three layers according to an analytical hierarchy. Bypass connections deliver input to underlying layers together with embedding outputs of the underlying layers to overlaying layers. The method includes training first, second and third layers by backward propagation using training examples directed to each layer, with regularized pass down to underlying layers during training. Specifically, this training includes (i) training the first layer using first layer training examples, (ii) training the second layer using second layer training examples with regularized pass down training to the first layer, and (iii) training the third layer using third layer training examples with regularized pass down training to the first and second layers. Regularized pass down training is regularized by constraining a training objective function, having a fitness function with at least two regularization terms. In addition, according to the technology disclosed the two regularization terms regularize by penalizing growth in a magnitude of weights in coefficient matrices applied to the underlying layers and successively regularize all changes in the weights in the coefficient matrices applied to the underlying layers.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The fitness function can be a negative log likelihood based cross-entropy, a mean squared error or a Kullback-Leibler divergence (KL-divergence). Further, according to the technology disclosed the fitness function can be represented by $$-\sum_{s}\sum_{t} \log p(y_t^{(n)} = \alpha \mid h_t^{(n)}) + \text{regularization\_terms}$$

where, (n) denotes the nth layer of the stacked LSTM, and $p(y_t^{(n)}=\alpha|h_t^{(n)})$ denotes the probability value that the correct label $\alpha$ is assigned to $W_t$ in the sentence S.

In some implementations the regularization term that penalizes growth in a magnitude of weights in coefficient matrices applied to the underlying layers is $\lambda\|W_{(m)}\|^2$ where (m), which is the same layer as n, denotes the layers 1 to m of the stacked LSTM, $\lambda$ is a L2-norm regularization hyperparameter, and $\|W_{(m)}\|$ applies the squaring operation element wise to elements of a weighting matrix for the layers 1 to m of the stacked LSTM.

In an implementation of the disclosed method, the successive regularization term $\delta\|\theta_{(m-1)}-\theta_{(m-1)}'\|^2$
where (m−1), which is the same layer as n−1, denotes the layers 1 to m−1 of the stacked LSTM, $\delta$ is a successive regularization hyperparameter, $\theta_{(m-1)}$ denotes layer parameters of one or more underlying layers, $\theta_{(m-31)}'$ denotes layer parameters of one or more underlying layers persisted in a previous sub-epoch, and $\|\theta_{(m-1)}-\theta_{(m-1)}'\|$ applies the squaring operation element wise to elements of a weighting matrix for the layers 1 to m−1 of the stacked LSTM.

Further, in the disclosed method, the analytical hierarchy in the stacked LSTM can include at least five layers or at least ten layers. Additionally, basement layers that are below the stacked LSTM can be trained separately from the stacked LSTM and can produce input used by a lowest layer of the stacked LSTM. Attic layers that are above the stacked LSTM can also be trained separately from the stacked LSTM and can consume output from an upper most layer of the stacked LSTM.

In another implementation, method is provided that conveys intermediate results from an underlying layer to an overlying layer in a neural network stack of bi-directional LSTMs. The neural network stack of bi-directional LSTMs includes layers corresponding to an analytical framework that process a sequence of tokens. Further, the underlying layer produces analytic framework label vectors for each of the tokens. Specifically, this method includes, for the sequence, analyzing the tokens using the underlying layer. The analyzing of the tokens can include (i) applying the bi-directional LSTM to compute forward and backward state vectors for each of the tokens, (ii) applying a classifier to the forward and backward state vectors to embed each of the tokens in an analytic framework label space, as label space vectors that have dimensionality about the same as a number of available analytical framework labels, and (iii) projecting the label space vectors of each token into an extended dimensionality label space, which has dimensionality about the same as dimensionality of the forward and backward states, to produce extended token label vectors. Additionally, the method includes conveying, from the underlying layer to the overlying layer, vectors of the forward state, the backward state, and the extended token label, thereby supplying input needed by the overlying layer to perform its role in the analytical framework for processing the tokens.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In some implementations, the disclosed method includes conveying by a bypass to the overlaying layer, vectors received as input by the underlying layer, other than state vectors. The underlying layer can be over two deeper layers. Additionally, the disclosed method can include conveying by bypasses to the overlaying layer, vectors received as input by the two deeper layers and embedded label vectors produced as output by the two deeper layers. This conveying by the bypass can cause the conveyed vectors to be conveyed without modification.

According to the disclosed method, the number of available analytical framework labels is one-fifth or less the dimensionality of the forward and backward states, thereby forming a dimensionality bottleneck that reduces overfitting when training the neural network stack of bi-directional LSTMs. Alternatively, the number of available analytical framework labels is one-tenth or less the dimensionality of the forward and backward states, thereby forming a dimensionality bottleneck that reduces overfitting when training the neural network stack of bi-directional LSTMs.

In another implementation a multi-layer neural network system, running on hardware that processes a sequence of tokens in an input sequence, is described that includes a stacked LSTM token sequence processor, running on hardware, stacked in layers according to an analytical hierarchy. The stacked LSTM includes bypass connections that deliver input to underlying layers together with embedding outputs of the underlying layers to overlaying layers. The stacked layers include (i) a first embedding layer and (ii) a second embedding layer overlying the first embedding layer. The first embedding layer is implemented as a bi-directional LSTM and a first label classifier and processes token embeddings representing the tokens in the input sequence. The first embedding layer also produces analytic framework label vectors for each of the tokens. Further, the bi-directional LSTM computes forward and backward state vectors for each of the tokens. Additionally, a classifier applied to the forward and backward state vectors embeds each of the tokens in an analytic framework label space, as label space vectors that have dimensionality about the same as a number of available analytical framework labels. The first embedding layer also projects the label space vectors of each token into an extended dimensionality label space, which has dimensionality about the same as dimensionality of the forward and backward states, to produce extended token label vectors. This method also includes the first embedding layer sending to the second embedding layer, vectors of the forward state, the backward state, and the extended token label, thereby supplying input needed by the second embedding layer to perform its role in the analytical framework for processing the tokens.

This system and other implementations of the technology disclosed can each optionally include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

In some implementations, the method further includes a bypass to the second embedding layer that conveys vectors received as input by the first embedding layer, other than state vectors.

In an implementation of the multi-layer neural network system, the first embedding layer is over two deeper layers. The system further conveys by bypassing to the second embedding layer, vectors received as input by the two deeper layers and embedded label vectors produced as output by the two deeper layers. A bypass can convey vectors without modification.

A number of available analytical framework labels can be one-fifth or less the dimensionality of the forward and backward states, thereby forming a dimensionality bottleneck that reduces overfitting when training the neural network stack of bi-directional LSTMs. Alternatively, the number of available analytical framework labels is one-tenth or less the dimensionality of the forward and backward states, thereby forming a dimensionality bottleneck that reduces overfitting when training the neural network stack of bi-directional LSTMs.

In another implementation, a multi-layer neural network system, running on hardware that processes words in an input sentence, including words not previously mapped into a word embedding space is described that includes a word embedder and a substring embedder, both of which process the words in the input sentence. The word embedder maps previously recognized words into a word embedding space and identifies previously unrecognized words, to produce word embedding vectors for each of the words. The substring embedder (i) processes character substrings of the word at multiple scales of substring length, (ii) maps each processed character substring into an intermediate vector representing a position in a character embedding space, and (iii) combines the intermediate vectors for each unique processed character substring to produce character embedding vectors for each of the words. The multi-layer neural network system also includes an embedder combiner that reports for use by a further process or processing layer both the word embedding vectors and the character embedding vectors, whereby a word not previously mapped into the word embedding space is nonetheless represented by the character embedding vector.

This system and other implementations of the technology disclosed can each optionally include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

In an implementation of the disclosed multi-layer neural network system, the substring embedder (i) combines the intermediate vectors by element-wise averaging of the intermediate vectors for each unique processed character substring or (ii) combines the intermediate vectors by element-wise selection of maximum values from the intermediate vectors for each unique processed character substring.

In some implementations, the substring vector processes the character substrings using substring lengths, not counting sentinels at beginning and ends of the words, of two characters, three characters, and four characters.

Dimensionality of the intermediate vectors can equal dimensionality of the word embedding vectors.

The technology disclosed can also project the intermediate vectors into a space of dimensionality that equals dimensionality of the word embedding vectors.

Additionally the multi-layer neural network system can include the word embedder mapping previously unrecognized words to a reserved word embedding vector for unknown words.

In another implementation, a method is provided that prepares words in an input sentence, including words not previously mapped into a word embedding space, for processing by multi-layer neural network system running on hardware. The processing can be performed using a word embedder and a substring embedder, both of which process the words in the input sentence. Specifically, the method includes, in the word embedder, mapping previously recognized words into a word embedding space and identifying previously unrecognized words, to produce word embedding vectors for each of the words. The method also includes, in the substring embedder and for each of the words in the input sentence, (i) processing character substrings of the word at multiple scales of substring length, (ii) mapping each processed character substring into an intermediate vector representing a position in a character embedding space, and (iii) combining the intermediate vectors for each unique processed character substring to produce character embedding vectors for each of the words. Additionally, the method includes outputting the word embedding vectors and the character embedding vectors, whereby a word not previously mapped into the word embedding space is nonetheless represented by the character embedding vector.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In some implementations, the substring embedder can (i) combine the intermediate vectors by element-wise averaging of the intermediate vectors for each unique processed character substring or (ii) combine the intermediate vectors by element-wise selection of maximum values from the intermediate vectors for each unique processed character substring.

The disclosed method can include the substring vector processing the character substrings using substring lengths, not counting sentinels at beginning and ends of the words, of two characters, three characters, and four characters.

A dimensionality of the intermediate vectors can equal dimensionality of the word embedding vectors.

In an implementation, the disclosed method can include (i) projecting the intermediate vectors into a space of dimensionality that equals dimensionality of the word embedding vectors, and/or (ii) the word embedder mapping previously unrecognized words to a reserved word embedding vector for unknown words.

In another implementation, a dependency parsing layer component of a neural network device, running on hardware, that processes words in an input sentence, is described. The dependency parsing layer overlies a chunk label embedding layer that produces chunk label embeddings and chunk state vectors. Further, the chunk label embedding layer, in turn, overlies a POS label embedding layer that produces POS label embeddings. The dependency parsing layer component includes a dependency parent layer and a dependency relationship label classifier. In addition, the dependency parent layer includes a bi-directional LSTM and one or more classifiers, that process the word embeddings, the POS label embeddings, the chunk label embeddings and the chunk state vectors, to produce parent label probability mass vectors by classification and exponential normalization of parent label state vectors produced by the bi-directional LSTM. The dependency parent layer also produces the parent label embedding vectors from the parent label probability mass vectors. The dependency relationship label classifier produces dependency relationship label probability mass vectors by classification and exponential normalization of the parent label state vectors and the parent label embedding vectors. Further, the dependency relationship label classifier produces the dependency relationship label embedding vectors from the dependency relationship label probability mass vectors. Dimensionalities of the POS label embedding vectors, the chunk label embedding vectors, and the dependency relationship label embedding vectors are similar, within +/− ten percent. The dependency parsing layer component further includes an output processor that outputs at least the dependency relationship label embedding vectors or dependency relationship labels based thereon.

This component and other implementations of the technology disclosed can each optionally include one or more of the following features and/or features described in connection with additional components disclosed. In the interest of conciseness, the combinations of features disclosed in this application are not individually enumerated and are not repeated with each base set of features. The reader will understand how features identified in this section can readily be combined with sets of base features identified as implementations.

In some implementations, the bi-directional LSTM produces forward and backward parent label state vectors for each respective word in the sentence, which represent forward and backward progressions of interactions among the words in the sentence, from which the parent label probability mass vectors are produced. The disclosed dependency parsing layer component of the neural network further includes an attention encoder that (i) processes the forward and backward state vectors for each respective word in the sentence, (ii) encodes attention as vectors of inner products between each respective word and other words in the sentence, with a linear transform applied to the forward and backward state vectors for the word or the other words prior to the inner product, and (iii) produces the parent label embedding vectors from the encoded attention vectors.

The linear transform applied prior to the inner product is trainable during training of the dependency parent layer and the dependency relationship classifier.

According to the disclosed dependency parsing layer component (i) a number of available analytical framework labels, over which the dependency relationship probability mass vectors are calculated, is one-fifth or less a dimensionality of the forward and backward states, thereby forming a dimensionality bottleneck that reduces overfitting when training the neural network stack of bidirectional LSTMs or (ii) the number of available analytical framework labels, over which the dependency relationship probability mass vectors are calculated, is one-tenth or less a dimensionality of the forward and backward states, thereby forming a dimensionality bottleneck that reduces overfitting when training the neural network stack of bidirectional LSTMs.

In one implementation a dependency parsing layer component of a neural network device, running on hardware, that processes words in an input sentence, is described. The dependency parsing layer overlies a chunk label embedding layer that produces chunk label embeddings and chunk state vectors. The chunk label embedding layer, in turn, overlies a POS label embedding layer that produces POS label embeddings and POS state vectors. The dependency parsing layer component includes a dependency parent layer and a dependency relationship label classifier. In addition, the dependency parent layer includes a dependency parent analyzer, implemented as a bi-directional LSTM, that processes the words in the input sentences. The bi-directional LSTM processes, for each word, word embeddings, the POS label embeddings, the chunk label embeddings, and the chunk state vector to accumulate forward and backward state vectors that represent forward and backward progressions of interactions among the words in the sentence. The dependency parent layer also includes an attention encoder that (i) processes the forward and backward state vectors for each respective word in the sentence, (ii) encodes attention as inner products between each respective word and other words in the sentence, with a linear transform applied to the forward and backward state vectors for the word or the other words prior to the inner product, and (iii) applies exponential normalization to vectors of the inner products to produce parent label probability mass vectors and projects the parent label probability mass vectors to produce parent label embedding vectors. Additionally, the dependency relationship label classifier, for each respective word in the sentence, (i) classifies and normalizes the forward and backward state vectors and the parent label embedding vectors and the parent label embedding vectors, to produce dependency relationship label probability mass vectors, and (ii) projects the dependency relationship label probability mass vectors to produce dependency relationship label embedding vectors. The dependency parsing layer component also includes an output processor that outputs at least results reflecting classification labels for the dependency relationship of each word, the dependency relationship label probability mass vectors, or the dependency relationship label embedding vectors.

This component and other implementations of the technology disclosed can each optionally include one or more of the following features and/or features described in connection with additional components disclosed. In the interest of conciseness, the combinations of features disclosed in this application are not individually enumerated and are not repeated with each base set of features. The reader will understand how features identified in this section can readily be combined with sets of base features identified as implementations.

The linear transform applied prior to the inner product is trainable during training of the dependency parent layer and the dependency relationship classifier.

In some implementations, (i) a number of available analytical framework labels, over which the dependency relationship probability mass vectors are calculated, is one-fifth or less a dimensionality of the forward and backward states, thereby forming a dimensionality bottleneck that reduces overfitting when training the neural network stack of bidirectional LSTMs or (ii) the number of available analytical framework labels, over which the dependency relationship probability mass vectors are calculated, is one-tenth or less a dimensionality of the forward and backward states, thereby forming a dimensionality bottleneck that reduces overfitting when training the neural network stack of bidirectional LSTMs.

In another implementation, a method is provided that dependency parses using a neural network device, running on hardware, that processes words in an input sentence. A dependency parsing layer overlies a chunk label embedding layer that produces chunk label embeddings and chunk state vectors. The chunk label embedding layer, in turn, overlies a POS label embedding layer that produces POS label embeddings. Further, the dependency parsing layer includes a dependency parent layer and a dependency relationship label classifier. The disclosed method includes, in the dependency parent layer, applying a bi-directional LSTM and one or more classifiers, that process the word embeddings, the POS label embeddings, the chunk label embeddings and the chunk state vectors, to produce parent label probability mass vectors by classification and exponential normalization of parent label state vectors produced by the bi-directional LSTM. The method also includes producing the parent label embedding vectors from the parent label probability mass vectors. The disclosed method further includes, in the dependency relationship label classifier, (i) producing dependency relationship label probability mass vectors by classification and exponential normalization of the parent label state vectors and the parent label embedding vectors, and (ii) producing the dependency relationship label embedding vectors from the dependency relationship label probability mass vectors. Dimensionalities of the POS label embedding vectors, the chunk label embedding vectors, and the dependency relationship label embedding vectors are similar, within +/− ten percent. According to the disclosed method, at least the dependency relationship label embedding vectors or dependency relationship labels are based thereon.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In some implementations, the method includes the bi-directional LSTM producing forward and backward parent label state vectors for each respective word in the sentence, which represent forward and backward progressions of interactions among the words in the sentence, from which the parent label probability mass vectors are produced. The method also includes, in an attention encoder that processes the forward and backward state vectors for each respective word in the sentence, encoding attention as vectors of inner products between each respective word and other words in the sentence. This includes applying a linear transform applied to the forward and backward state vectors for the word or the other words prior to the inner product, and producing the parent label embedding vectors from the encoded attention vectors.

The linear transform can be applied prior to the inner product is trainable during training of the dependency parent layer and the dependency relationship classifier.

According to the disclosed method, (i) a number of available analytical framework labels, over which the dependency relationship probability mass vectors are calculated, is one-fifth or less a dimensionality of the forward and backward states, thereby forming a dimensionality bottleneck that reduces overfitting when training the neural network stack of bidirectional LSTMs or (ii) the number of available analytical framework labels, over which the dependency relationship probability mass vectors are calculated, is one-tenth or less a dimensionality of the forward and backward states, thereby forming a dimensionality bottleneck that reduces overfitting when training the neural network stack of bidirectional LSTMs.

In another implementation, method is provided that dependency parses using a neural network device, running on hardware, that processes words in an input sentence. A dependency parsing layer overlies a chunk label embedding layer that produces chunk label embeddings and chunk state vectors. The chunk label embedding layer, in turn, overlies a POS label embedding layer that produces POS label embeddings. Further, the dependency parsing layer includes a dependency parent layer and a dependency relationship label classifier. The disclosed method includes, in the dependency parent layer, in a dependency parent analyzer, applying a bi-directional LSTM to process the words in the input sentences. These processes include processing, for each word, word embeddings, the POS label embeddings, the chunk label embeddings, and the chunk state vector to accumulate forward and backward state vectors that represent forward and backward progressions of interactions among the words in the sentence. The disclosed method also includes, in the dependency parent layer, in an attention encoder that processes the forward and backward state vectors for each respective word in the sentence, (i) encoding attention as inner products between each respective word and other words in the sentence, with a linear transform applied to the forward and backward state vectors for the word or the other words prior to the inner product and (ii) applying exponential normalization to vectors of the inner products to produce parent label probability mass vectors and projects the parent label probability mass vectors to produce parent label embedding vectors. Further, according to the disclosed method, in the dependency relationship label classifier and for each respective word in the sentence, (i) classifying and normalizing the forward and backward state vectors and the parent label embedding vectors and the parent label embedding vectors, to produce dependency relationship label probability mass vectors, and (ii) projecting the dependency relationship label probability mass vectors to produce dependency relationship label embedding vectors. The disclosed method also includes outputting at least results reflecting classification labels for the dependency relationship of each word, the dependency relationship label probability mass vectors, or the dependency relationship label embedding vectors.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The linear transform applied prior to the inner product is trainable during training of the dependency parent layer and the dependency relationship classifier.

According to the disclosed method, (i) a number of available analytical framework labels, over which the dependency relationship probability mass vectors are calculated, is one-fifth or less a dimensionality of the forward and backward states, thereby forming a dimensionality bottleneck that reduces overfitting when training the neural network stack of bidirectional LSTMs or (ii) the number of available analytical framework labels, over which the dependency relationship probability mass vectors are calculated, is one-tenth or less a dimensionality of the forward and backward states, thereby forming a dimensionality bottleneck that reduces overfitting when training the neural network stack of bidirectional LSTMs.

Other implementations may include a tangible non-transitory computer readable medium impressed with instructions that are combinable with a processor and memory coupled to the processor. The instructions, when executed on a computer device and one or more servers, perform any of the methods described earlier. In yet other implementations, a tangible non-transitory computer readable medium with instructions that are combinable with a processor and memory coupled to the processor carry out the systems described earlier.

Yet another implementation may include a computing system including at least one server comprising one or more processors and memory, coupled to the processors, containing computer instructions that, when executed on the processors, cause the computing system to perform any of the processes described earlier.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Computer System

Figure 11:
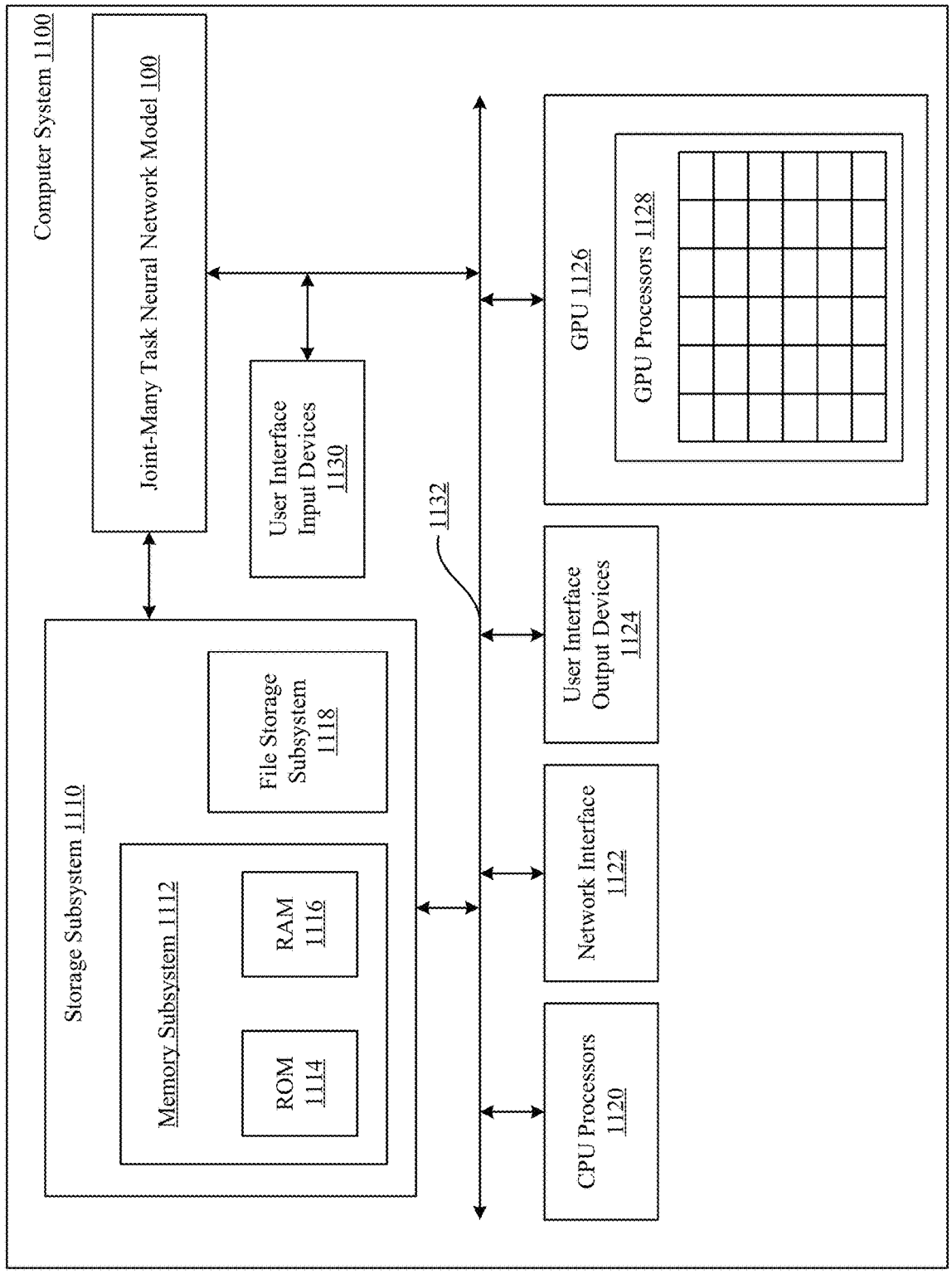
FIG. 11 is a simplified block diagram of a computer system that can be used to implement the joint many-task neural network model.

FIG. 11 is a simplified block diagram of a computer system 1100 that can be used to implement the joint many-task neural network model 100. Computer system 1100 typically includes one or more CPU processors 1120 that communicate with a number of peripheral devices via bus subsystem 1132. These peripheral devices can include a memory subsystem 1112 including, for example, memory devices and a file storage subsystem 1118, user interface input devices 1130, user interface output devices 1124, a network interface subsystem 1122, and a GPU 1126 with multiple GPU processing cores or GPU processors 1128. The input and output devices allow user interaction with computer system 1100. Network interface subsystem 1122 provides an interface to outside networks, including an interface to corresponding interface devices in other computer systems.

The operations of the joint many-task neural network model 100 are performed by the GPU processing cores 1128, according to some implementations.

User interface input devices 1130 or clients or client devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1124 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. These software modules are generally executed by CPU processors 1120 alone or in combination with other processors like GPU processors 1128.

Memory subsystem 1112 in the storage subsystem can include a number of memories including a main random access memory (RAM) 1116 for storage of instructions and data during program execution and a read only memory (ROM) 1114 in which fixed instructions are stored. A file storage subsystem 1118 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1118 or the memory subsystem 1112, or in other machines accessible by the processor.

Bus subsystem 1132 provides a mechanism for letting the various components and subsystems of computer system 1100 communicate with each other as intended. Although bus subsystem 1132 is shown schematically as a single bus, alternative implementations of the bus subsystem can use multiple busses. In some implementations, an application server (not shown) can be a framework that allows the applications of computer system 1100 to run, such as the hardware and/or software, e.g., the operating system.

Computer system 1100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present invention. Many other configurations of computer system 1100 are possible having more or less components than the computer system depicted in FIG. 11.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A multi-layer neural network system running on hardware that processes words in an input sentence, the system including:
a stacked long-short-term-memory (LSTM) sentence processor stacked in layers according to a linguistic hierarchy, with bypass connections that deliver input to underlying layers together with embedding outputs of the underlying layers to overlaying layers, the stacked layers including:
a part-of-speech (POS) label embedding layer;
a chunk label embedding layer overlying the POS label embedding layer; and
a dependency parent identification and dependency relationship label embedding layer overlying the chunk label embedding layer;
the POS label embedding layer, implemented as a first bi-directional LSTM and a POS label classifier, processes word embedding vectors representing the words in the input sentence, and produces POS label embedding vectors and POS state vectors for each of the words;
the chunk label embedding layer, implemented as a second bi-directional LSTM and a chuck label classifier, processes at least the word embedding vectors, the POS label embedding vectors and the POS state vectors, to produce chunk label embeddings and chunk state vectors;
the dependency parent identification and dependency relationship label embedding layer, implemented as a third bi-directional LSTM and one or more classifiers, processes the word embedding vectors, the POS label embedding vectors, the chunk label embeddings and the chunk state vectors, to identify dependency parents of each of the words in the input sentence to produce dependency relationship labels or label embeddings of relationships between the words and respective potential parents of the words; and
an output processor that outputs at least results reflecting the identification of dependency parents and production of dependency relationship label embeddings for the words in the input sentence.

2. The system of claim 1, further including:
the POS label embedding layer further processes n-character-gram embedding vectors that represent the words in the input sentence, in addition to the word embedding vectors; and
the bypass connections further deliver the n-character-gram embedding vectors to the chunk label embedding layer and the dependency parent and dependency relationship label embedding layer as input to respective bi-directional LSTMs in those overlaying layers.

3. The system of claim 1, further including:
the POS label embedding layer further produces POS label probability mass vectors, by exponential normalization of a non-linear transformation of the POS state vectors, and produces the POS label embedding vectors, from the POS label probability mass vectors;
the chunk label embedding layer further produces chunk label probability mass vectors, by exponential normalization of the chunk state vectors, and produces the chunk label embedding vectors from the chunk label probability mass vectors;
the dependency parent identification and dependency relationship label embedding layer further produces parent label probability mass vectors by classification and exponential normalization of parent label state vectors produced by the third bi-directional LSTM;
produces parent label embedding vectors from the parent label probability mass vectors;
produces dependency relationship label probability mass vectors by classification and exponential normalization of the parent label state vectors and the parent label embedding vectors; and
produces the dependency relationship label embedding vectors from the dependency relationship label probability mass vectors; and
dimensionalities of the POS label embedding vectors, the chunk label embedding vectors, and the dependency relationship label embedding vectors are similar, within +/−ten percent.

4. The system of claim 1, further including a word embedding processor, underlying the POS label embedding layer, that includes:
a word embedder and an n-character-gram embedder;
the word embedder maps the words in the input sentence, when recognized, into a word embedding space represented by a word embedding vector;

the n-character-gram embedder:
  processes character substrings of the word at multiple scales of substring length;
  maps each processed character substring into an intermediate vector representing a position in a character embedding space; and
  combines the intermediate vectors for each unique processed character substring to produce character embedding vectors for each of the words; and
the word embedding processor combines results of the word embedder and the n-character-gram embedder, whereby a word not previously mapped into the word embedding space is nonetheless represented by the character embedding vector.

5. The system of claim 4, wherein the n-character-gram embedder combines the intermediate vectors to produce element wise average in the character embedding vector.

6. The system of claim 1, further including operating the system without a beam search in the POS label embedding layer, the chunk label embedding layer or the dependency parent identification and dependency relationship label embedding layer.

7. The system of claim 1, further including:
a semantic relatedness layer, overlying the dependency parent identification and dependency relationship label embedding layer, that includes a relatedness vector calculator and a relatedness classifier;
the semantic relatedness layer operates on pairs of first and second sentences processed through the system of claim 1;
the relatedness vector calculator calculates a sentence-level representation of each of the first and second sentences, including:
  a bi-directional LSTM calculation of forward and backward state vectors for each of the words in the respective sentences; and
  an element-wise max pooling calculation over the forward and backward state vectors for the words in the respective sentences to produce sentence-level state vectors representing the respective sentences; and
the relatedness vector calculator further calculates an element-wise sentence-level relatedness vector that is processed by the relatedness classifier to derive a categorical classification of relatedness between the first and second sentences.

8. The system of claim 7, further including:
an entailment layer, overlying the semantic relatedness layer, that includes an entailment vector calculator and an entailment classifier;
the entailment vector calculator calculates a sentence-level representation of each of the first and second sentences, including:
  a bi-directional LSTM calculation of forward and backward state vectors for each of the words in respective sentences; and
  an element-wise max pooling calculation over the forward and backward state vectors for the words in the respective sentences to produce sentence-level state vectors representing the respective sentences; and
the entailment vector calculator further calculates an element-wise sentence-level entailment vector that is processed by the entailment classifier to derive a categorical classification of entailment between the first and second sentences.

9. A method that processes words in an input sentence using a stacked layer long-short-term-memory (LSTM) sentence processor running on hardware, stacked in layers according to a linguistic hierarchy, the stacked layers including:
a part-of-speech (POS) label embedding layer;
a chunk label embedding layer overlying the POS label embedding layer; and
a dependency parent identification and dependency relationship label embedding layer overlying the chunk label embedding layer;
the method including:
  delivering, via bypass connections, input used by underlying layers together with embedding outputs from the underlying layers to overlaying layers;
  in the POS label embedding layer, applying a first bi-directional LSTM and a POS label classifier to process word embedding vectors representing the words in the input sentence, and producing POS label embedding vectors and POS state vectors for each of the words;
  in the chunk label embedding layer, applying a second bi-directional LSTM and a chuck label classifier to process at least the word embedding vectors, the POS label embedding vectors and the POS state vectors, and producing chunk label embeddings and chunk state vectors;
  in the dependency parent identification and dependency relationship label embedding layer, applying a third bi-directional LSTM and one or more classifiers to process the word embedding vectors, the POS label embedding vectors, the chunk label embeddings and the chunk state vectors, to identify dependency parents of each of the words in the input sentence and producing dependency relationship labels or label embeddings of relationships between the words and respective potential parents of the words; and
  outputting results reflecting the dependency relationship labels or label embeddings for the words in the input sentence.

10. The method of claim 9, further including:
in the POS label embedding layer, further processing n-character-gram embedding vectors that represent the words in the input sentence, in addition to the word embedding vectors; and
the bypass connections further delivering the n-character-gram embedding vectors to the chunk label embedding layer and the dependency parent and dependency relationship label embedding layer as input to respective bi-directional LSTMs in those overlaying layers.

11. The method of claim 9, further including:
in the POS label embedding layer, further producing POS label probability mass vectors, by exponential normalization of the POS state vectors, and producing the POS label embedding vectors, from the POS label probability mass vectors;
in the chunk label embedding layer, further producing chunk label probability mass vectors, by exponential normalization of the chunk state vectors, and producing the chunk label embedding vectors from the chunk label probability mass vectors;
in the dependency parent identification and dependency relationship label embedding layer further:
producing parent label probability mass vectors by classification and exponential normalization of parent label state vectors produced by the third bi-directional LSTM;

producing parent label embedding vectors from the parent label probability mass vectors;

producing dependency relationship label probability mass vectors by classification and exponential normalization of the parent label state vectors and the parent label embedding vectors; and producing the dependency relationship label embedding vectors from the dependency relationship label probability mass vectors; and dimensionalities of the POS label embedding vectors, the chunk label embedding vectors, and the dependency relationship label embedding vectors are similar, within +/−ten percent.

12. The method of claim 9, the stacked layers further including a sentence embedding layer, underlying the POS label embedding layer, that includes a word embedder and an n-character-gram embedder, the method further including:

in the word embedder, mapping the words in the sentence, when recognized, into a word embedding space represented by a word embedding vector;

in the n-character-gram embedder:

processing character substrings of the word at multiple scales of substring length;

mapping each processed character substring into an intermediate vector representing a position in a character embedding space; and combining the intermediate vectors for each unique processed character substring to produce character embedding vectors for each of the words; and the sentence embedding layer outputting vectors from the word embedder and the n-character-gram embedder, whereby a word not previously mapped into the word embedding space is nonetheless represented by the character embedding vector.

13. The method of claim 12, wherein the n-character-gram embedder combines the intermediate vectors to produce element wise average in the character embedding vector.

14. The method of claim 9, the stacked layers further including a semantic relatedness layer, overlying the dependency parent identification and dependency relationship label embedding layer, which includes a relatedness vector calculator and a relatedness classifier, the method further including:

in the semantic relatedness layer, operating on pairs of first and second sentences processed through the method of claim 9;

in the relatedness vector calculator, calculating a sentence-level representation of each of the first and second sentences, including:

applying a fourth bi-directional LSTM to calculate forward and backward state vectors for each of the words in the respective sentences; and calculating an element-wise maximum of the forward and backward state vectors for each of the respective sentences;

in the relatedness vector calculator, further calculating an element-wise sentence-level relatedness vector; and processing the sentence-level relatedness vector to derive a categorical classification of relatedness between the first and second sentences.

15. The method of claim 14, the stacked layers further including an entailment layer, overlying the semantic relatedness layer, which includes an entailment vector calculator and an entailment classifier, the method further including:

in the entailment vector calculator calculating a sentence-level representation of each of the first and second sentences, including:

applying a fourth bi-directional LSTM to calculate forward and backward state vectors for each of the words in respective sentences; and calculating an element-wise maximum of the forward and backward state vectors for each of the respective sentences;

in the entailment vector calculator, further calculating an element-wise sentence-level entailment vector; and processing the sentence-level entailment vector to derive a categorical classification of entailment between the first and second sentences.

* * * * *